United States Patent
Andrew et al.

(10) Patent No.: US 6,664,902 B2
(45) Date of Patent: Dec. 16, 2003

(54) STORING CODING IMAGE DATA IN STORAGE OF FIXED MEMORY SIZE

(75) Inventors: James Philip Andrew, Waverton (AU); Timothy Merrick Long, Lindfield (AU); Peter Leslie Bell, Normanhurst (AU); Kevin John Moore, North Ryde (AU); James David Clark, Manly (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/003,101

(22) Filed: Dec. 6, 2001

(65) Prior Publication Data

US 2002/0131084 A1 Sep. 19, 2002

(30) Foreign Application Priority Data

Dec. 6, 2000 (AU) .............................................. PR1927

(51) Int. Cl.[7] .............................................. H03M 7/00
(52) U.S. Cl. ............................ 341/50; 341/51; 382/239
(58) Field of Search ...................... 341/50, 51; 382/232, 382/239, 248, 250, 233, 166, 240; 375/240.14

(56) References Cited

U.S. PATENT DOCUMENTS

| | | | | |
|---|---|---|---|---|
| 5,504,823 A | * | 4/1996 | Yoon .......................... 382/233 |
| 5,699,457 A | | 12/1997 | Adar et al. .................. 382/239 |
| 5,748,786 A | | 5/1998 | Zandi et al. ................. 382/240 |
| 5,761,345 A | | 6/1998 | Saito et al. ................. 382/246 |
| 5,768,424 A | | 6/1998 | Long .......................... 382/232 |
| 5,815,097 A | | 9/1998 | Schwartz et al. ............. 341/51 |
| 5,936,670 A | * | 8/1999 | Frencken ................. 375/240.14 |
| 6,016,360 A | * | 1/2000 | Nguyen et al. .............. 382/166 |
| 6,246,798 B1 | | 6/2001 | Andrew et al. .............. 382/240 |
| 6,259,819 B1 | | 7/2001 | Andrew et al. .............. 382/248 |
| 6,263,110 B1 | | 7/2001 | Andrew et al. .............. 382/232 |
| 6,266,414 B1 | | 7/2001 | Bradley et al. ............. 380/240 |
| 6,266,450 B1 | * | 7/2001 | Yip et al. .................. 382/240 |
| 6,351,568 B1 | * | 2/2002 | Andrew ...................... 382/239 |
| 6,411,736 B1 | * | 6/2002 | Yip et al. .................. 382/233 |
| 6,420,979 B1 | * | 7/2002 | Katayama ..................... 341/51 |

FOREIGN PATENT DOCUMENTS

| | | | |
|---|---|---|---|
| EP | 0782345 A2 | 7/1997 | ............. H04N/7/50 |
| WO | WO 98/13787 | 4/1998 | ............. G06T/9/00 |

* cited by examiner

Primary Examiner—Jean Bruner JeanGlaude
(74) Attorney, Agent, or Firm—Fitzpatrick, Cella, Harper & Scinto

(57) ABSTRACT

An apparatus includes a DCT unit for transforming blocks of pixels into respective blocks of transform coefficients, entropy encoders for encoding respective partitions of the DCT blocks where at least one partition comprises bit-plane data from each block of transform coefficients, and a scan output manager for storing the entropy encoded partitions in a buffer of fixed memory size. The manager manages the storing of the coded partitions in the buffer whereby during the storing of the coded partitions if it is determined the buffer is full, a coded least perceptably significant partition currently stored in the buffer is overwritten by data from a coded more perceptably significant partition.

50 Claims, 13 Drawing Sheets

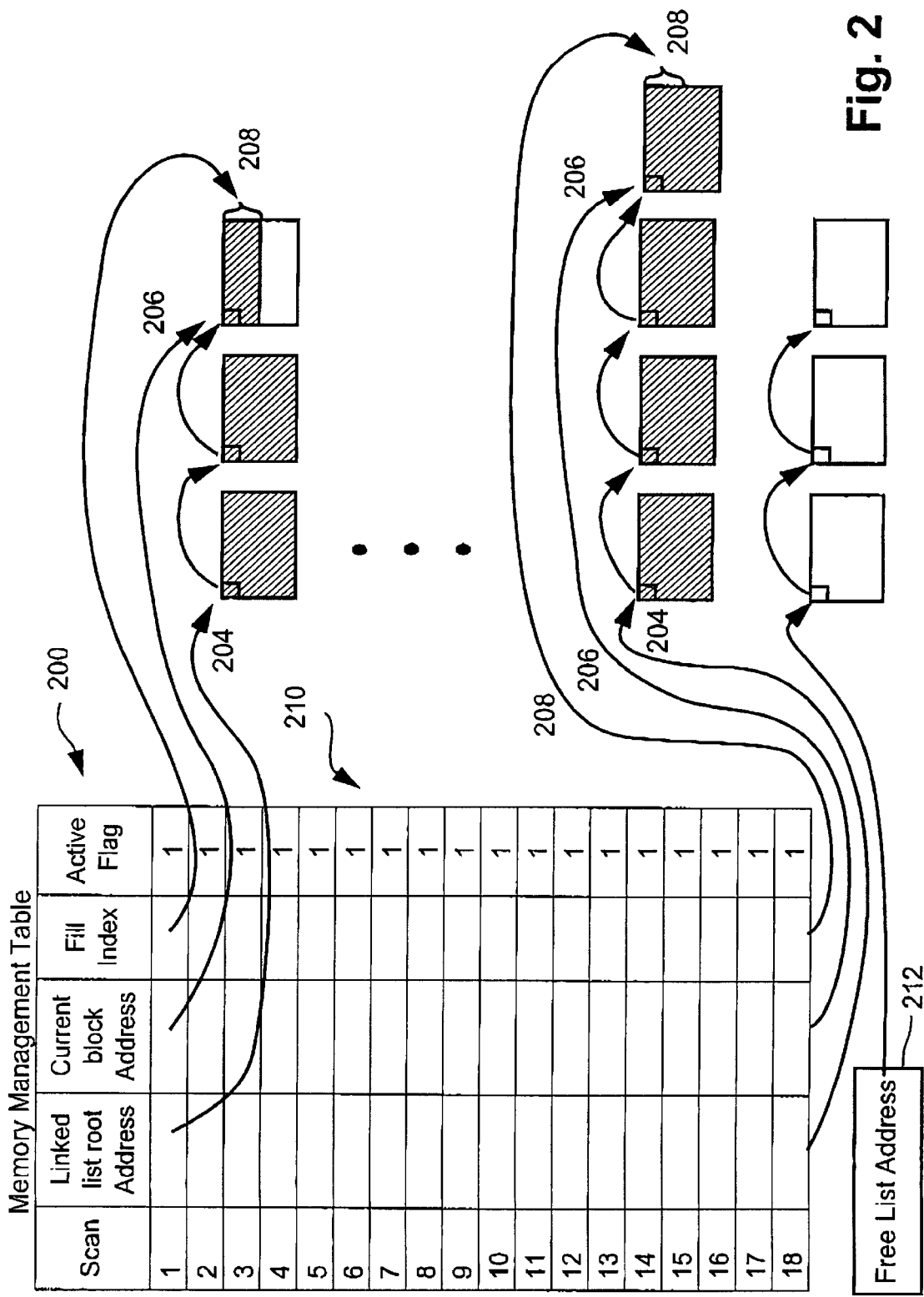

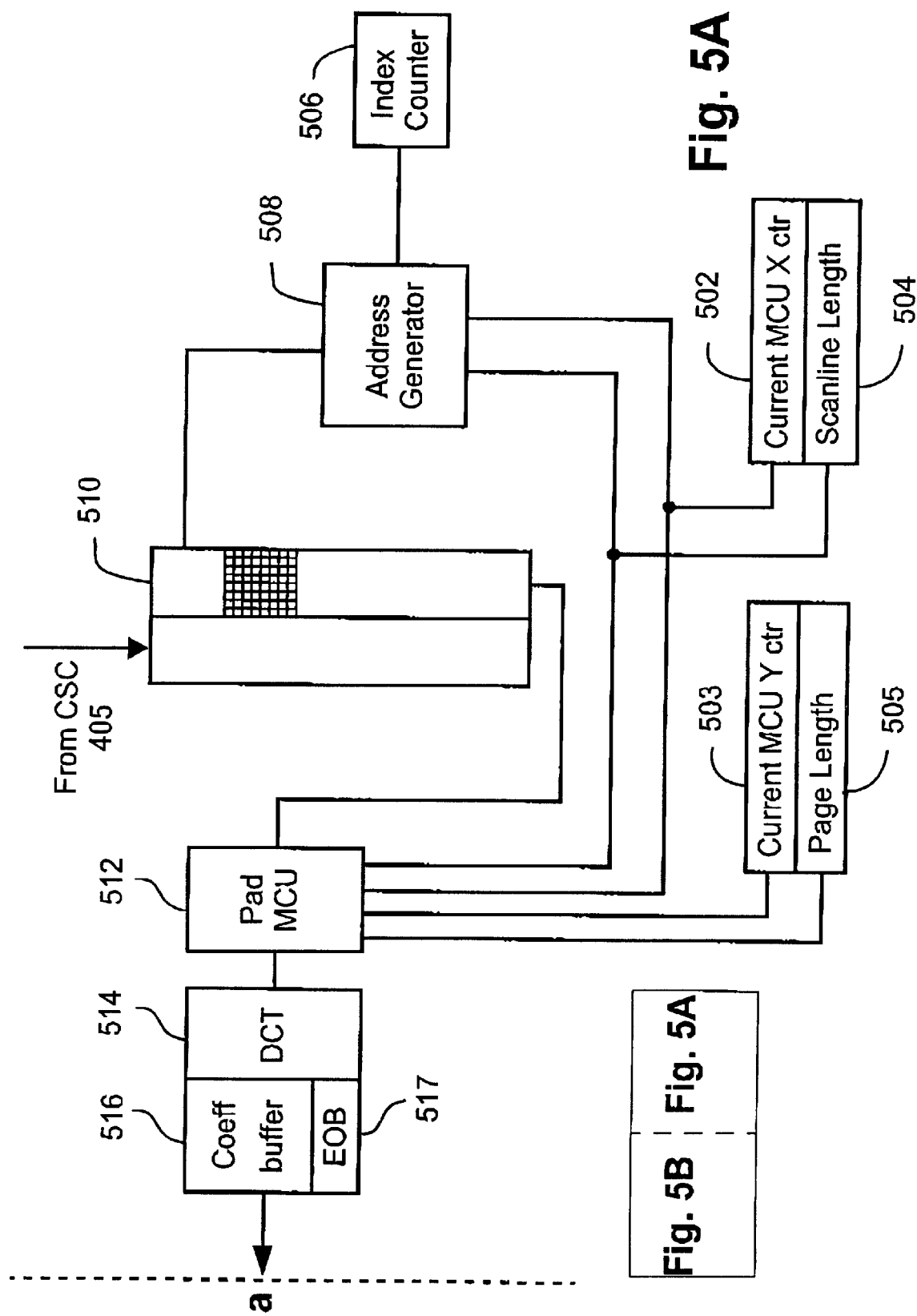

| DC band 1 (1) | AC band 1 (2) | AC band 2 (3) | AC band 3 (4) |
|---|---|---|---|
| DC band 2 (5) | AC band 4 (6) | AC band 5 (7) | AC band 6 (8) |
| DC band 3 (9) | AC band 7 (10) | AC band 8 (11) | AC band 9 (12) |
| DC band 4 (13) | AC band 10 (14) | AC band 11 (15) | AC band 12 (16) |
| 0 (1) | 1 ... 5 (5) | 6 ... 20 (15) | 21 ... 63 (43) |

Magnitude bit plane: ... 3, 2, 1, 0

Zigzag Index

Fig 7.

STORING CODING IMAGE DATA IN STORAGE OF FIXED MEMORY SIZE

This patent specification contains material that is subject to copyright protection. The copyright owner has no objection to the reproduction of this patent specification or related materials from associated patent office files for the purposes of review, but otherwise reserves all copyright whatsoever.

1. Field of the Invention

The present invention relates to digital image compression and in particular to image compression in raster image processing systems where memory resources are limited.

2. Background

Image compression is widely used in color raster image processing systems such as those found in printers. Image compression is used in these systems to reduce the amount of memory required to store raster images in the stages between pixel generation and the time when the final output has been delivered from the printer. Reducing the amount of memory reduces the total system cost.

In color printing environments the total uncompressed size of a generated pixel images is often large and it is advantageous to avoid storing the entire image. Such pixel images are typically generated in raster or band order. In particular, pixels, scanlines, groups of scanlines, or tiles, are emitted in a stream from a raster image processor (RIP) that has as input an object graphic description of the page to be printed. In some simple cases this raster image data stream may be fed directly to a print engine. But in many circumstances this is not possible. This may be because the print engine requires real-time data delivery, because the image must be kept in case error recovery is required, or because the image must be kept for printing later in a duplexing system. Many other reasons exist. In systems where the raster image data must be kept, it is often fed to a compressor in a pipeline fashion such that intermediate storage between the RIP and the compressor is small compared with the total uncompressed image size. The output of the compressor is also considerably smaller than the uncompressed image size.

Many compression schemes can be used in this environment. One widely used method for color images is the baseline method of the Joint Photographic Experts Group (JPEG) standard. However compression using baseline JPEG standard and other methods suffers a number of serious flaws that make their use difficult in systems with limited memory resources. Existing compression schemes all exhibit one or more of the following flaws when presented with streamed input data:

The memory available to receive the compression data can be over-run. Compression schemes are typically highly data-dependent and without knowing details of the input data ahead of time it is not possible to predict what size output buffer will be required to accept the compressed data. This is a serious problem for systems with limited memory resources. Allocating a large output buffer is typically wasteful, and often still not a guarantee that the compressed data will fit. Some schemes exist that limit total compressed size by maintaining a sufficiently high compression factor on local regions of the image, but in these schemes it is not possible to trade off one part of the image that compresses well against another that does not.

For lossy compression schemes (such as baseline JPEG) the degree of loss must be selected ahead of time. Control of the degree of perceptual degradation (in short, loss) is a common method of controlling the output compression size. But this must generally be selected consistently across a whole image to achieve consistent visual quality, and must be selected at the start of the compression operation. The image may become unnecessarily compressed. Where a high-loss setting is used for a compression operation, it may transpire that the image data compressed well and a less-lossy setting could have been used in comparison with the system's available memory. A less-lossy setting would have resulted in higher final image quality which is advantageous.

The compression scheme may require random access to, or multiple passes over, the uncompressed image data. Some compression schemes exist that overcome one or more of the earlier problems by using either random access to the uncompressed image data or by performing multiple passes over it. But this is disadvantageous because it requires storage either of the uncompressed image data or of the original data that is used to generate the image data.

U.S. Pat. No. 5,761,345 publishes an image processing apparatus initially storing variable length codes corresponding to a significant frequency component, and variable length codes corresponding to a less significant frequency component. If while storing the variable length codes into the storage means, it is detected that the storage means is full (with variable length codes), the control means makes room for the storage of further variable length codes corresponding to the more significant frequency component by cancelling variable length codes stored in the storage means, which correspond to the less significant frequency component. However, the image processing apparatus suffers from the disadvantage in that it makes inefficient use of the storage means and the decompressed image may have relatively low image quality.

U.S. Pat. No. 5,748,786 publishes a method for one-pass compression into a fixed size buffer. The methods use a reversible DWT with embedded coding. The method suffers from the disadvantage in that it requires significant amount of input image line buffering, and a high cost to implement the suggested entropy coder with current technology, particularly when many such parallel encoders/decoders ate required in a real time application.

U.S. Pat. No. 5,815,097 publishes a method for a one-pass spatially embedded coder. The method, avoiding so called costly transform domain techniques (such as JPEG/DCT methods), supports fixed rate and fixed size applications for one-pass encoding and decoding. That is the image is compressed into a fixed size buffer, in one-pass, with a relatively small working line buffer, without the need to buffer the entire input image. However, by avoiding so called costly transform domain techniques, the method suffers from the disadvantage in that it either makes inefficient use of the storage means and the decompressed image may have relative low image quality, or requires the use of sophisticated and costly arithmetic coders, whose cost is high in current technology, particularly when many such parallel encoders/decoders are required in a real time application.

These problems may also occur in many other related raster image processing systems such as digital cameras and scanners.

SUMMARY OF THE INVENTION

It is an object of the present invention to substantially overcome, or at least ameliorate, one or more disadvantages of existing arrangements.

According to one aspect of the invention, there is provided a method of storing coded image data of an image in a storage of fixed memory size, wherein the image comprises a plurality of pixels and the method comprises the steps of arranging the image into a plurality of bands each comprising a predetermined number N of consecutive lines of pixels; buffering and processing said bands one by one in turn, wherein the processing step comprises the following sub-steps for each currently buffered said band: arranging the current band into a plurality of blocks of pixels of size M×M, wherein M is equal to said predetermined number N; transforming said blocks of pixels to produce respective blocks of transform coefficients; partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; coding each said partition; and managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition.

According to another aspect of the invention, there is provided a method of storing coded image data of an image in a storage of fixed memory size, wherein the image comprises a plurality of pixels and the method comprises the steps of: arranging the image into a plurality of bands each comprising a predetermined number N of consecutive lines of pixels; buffering and processing said bands one by one in turn, wherein the processing step comprises the following sub-steps for each currently buffered said band: arranging the current band into a plurality of blocks of pixels of size M×M, wherein M is equal to said predetermined number N; transforming said blocks of pixels to produce respective blocks of transform coefficients; partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; coding each said partition; and managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition, and wherein the managing step comprises the sub-steps of: assigning in said storage corresponding linked lists for said coded partitions; and determining during said storage of said coded partitions if the storage is full and if so freeing a said linked list of a coded least perceptually significant partition currently stored in said buffer allowing it to be overwritten by data from a coded more perceptually significant partition.

According to a still another aspect of the invention, there is provided a method of decoding an image, wherein the method comprising the steps of buffering respective coded data of bands of the image one by one in turn in storage of fixed memory size; processing the respective coded data of the bands of the image, wherein the processing step comprises the following sub-steps for each currently buffered said band: retrieving information from said storage on at least one linked list stored in said storage corresponding to at least one coded partition; retrieving from said storage said at least one partition utilising said information; decoding said retrieved at least one partition; reconstituting blocks of transform coefficients of size M×M from said at least one decoded partition, wherein each decoded partition comprises data from blocks of transform coefficients, and wherein the at least one partition comprise a perceptually significant partition; inverse transforming said blocks of transform coefficients to produce respective blocks of pixels coefficients; and reconstituting the current band of said image from said blocks of pixels, wherein said band comprises a predetermined number N of lines of pixels and said M is equal to said predetermined number N.

According to a still another aspect of the invention, there is provided apparatus for storing coded image data of an image in storage of fixed memory size, wherein the image comprises a plurality of pixels and the apparatus comprises: a module for arranging the image into a plurality of bands each comprising a predetermined number N of consecutive lines of pixels; a buffer for buffering said bands one by one in turn; and a processor for processing a currently said buffered band, wherein the processor comprises: a module arranging the currently buffered band into a plurality of blocks of pixels of size M×M, wherein M is equal to said predetermined number N; a transform module transforming said blocks of pixels to produce respective blocks of transform coefficients, a partitioning module for partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; a coder module for coding each said partition; and a manager module for managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition.

According to a still another aspect of the invention, there is provided apparatus for storing coded image data of an image in storage of fixed memory size, wherein the image comprises a plurality of pixels and the apparatus comprises: a module for arranging the image into a plurality of bands each comprising a predetermined number N of consecutive lines of pixels; a buffer for buffering said bands one by one in turn; and a processor for processing a currently said buffered band, wherein the processor comprises: a module arranging the currently buffered band into a plurality of blocks of pixels of size M×M, wherein M is equal to said predetermined number N; a transform module transforming said blocks of pixels to produce respective blocks of transform coefficients; a partitioning module for partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; a coder module for coding each said partition; and a manager module for managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition, and wherein the manager module comprises: a module for assigning in said storage corresponding linked lists for said coded partitions; and a module for determining during said storage of said coded partitions if the storage is fill and if so freeing a said linked list of a coded least perceptually significant partition currently stored in said buffer allowing it to be overwritten by data from a coded more perceptually significant partition.

According to a still another aspect of the invention, there is provided apparatus for decoding an image, wherein the apparatus comprises: a module for buffering respective coded data of bands of the image one by one in turn in storage of fixed memory size; a processor for processing a currently buffered band of coded data, wherein the processor comprises: a module for retrieving information from said storage on at least one linked list stored in said storage corresponding to at least one coded partition of the currently buffered band of coded data; a module for retrieving from said storage said at least one partition utilising said information; a decoding module for decoding said retrieved at least one partition; a module for reconstituting blocks of transform coefficients of size M×M from said at least one decoded partition, wherein each decoded partition comprises data from blocks of transform coefficients, and wherein the at least one partition comprise a perceptually significant partition; an inverse transform module for inverse transforming said blocks of transform coefficients to produce respective blocks of pixels coefficients; and a module for reconstituting the current band of said image from said blocks of pixels, wherein said band comprises a predetermined number N of lines of pixels and said M is equal to said predetermined number N.

According to a still another aspect of the invention, there is provided a computer program for storing coded image data of an image in a storage of fixed memory size, wherein the image comprises a plurality of pixels and the computer program comprises: means for arranging the image into a plurality of bands each comprising a predetermined number N of consecutive lines of pixels; means for buffering and processing said bands one by one in turn, wherein the processing means performs the following steps for each currently buffered said band: arranging the current band into a plurality of blocks of pixels of size M×M, wherein M is equal to said predetermined number N; transforming said blocks of pixels to produce respective blocks of transform coefficients; partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; coding each said partition; and managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition.

According to a still another aspect of the invention, there is provided a computer program for storing coded image data of an image in a storage of fixed memory size, wherein the image comprises a plurality of pixels and the computer program comprises: means for arranging the image into a plurality of bands each comprising a predetermined number N of consecutive lines of pixels; means for buffering and processing said bands one by one in turn, wherein the processing means performs the comprises the following steps for each currently buffered said band: arranging the current band into a plurality of blocks of pixels of size M×M, wherein M is equal to said predetermined number N; transforming said blocks of pixels to produce respective blocks of transform coefficients; partitioning the blocks of transform coefficients into a plurality of partitions wherein each partition comprises data from each said block of transform coefficients and at least one partition comprises data from at least one but not all bit-planes of each said block of transform coefficients, and wherein the plurality of partitions comprise a perceptually significant partition and a perceptually insignificant partition and partitions of varying perceptually significance there between; coding each said partition; and managing the storing of the said coded partitions in the storage of fixed memory size, wherein during the storing of said coded partitions if it is determined the storage is full a coded least perceptually significant partition currently stored in said buffer is overwritten by data from a coded more perceptually significant partition, and wherein the managing step comprises the sub-steps of: assigning in said storage corresponding linked lists for said coded partitions; and determining during said storage of said coded partitions if the storage is fill and if so freeing a said linked list of a coded least perceptually significant partition currently stored in said buffer allowing it to be overwritten by data from a coded more perceptually significant partition.

According to a still another aspect of the invention, there is provided a computer program for decoding an image, wherein the computer program comprises: means for buffering respective coded data of bands of the image one by one in turn in storage of fixed memory size; and means for processing the respective coded data of the bands of the image, wherein the processing means performs the following steps for each currently buffered said band: retrieving information from said storage on at least one linked list stored in said storage corresponding to at least one coded partition; retrieving from said storage said at least one partition utilising said information; decoding said retrieved at least one partition; reconstituting blocks of transform coefficients of size M×M from said at least one decoded partition, wherein each decoded partition comprises data from blocks of transform coefficients, and wherein the at least one partition comprise a perceptually significant partition; inverse transforming said blocks of transform coefficients to produce respective blocks of pixels coefficients; and reconstituting the current band of said image from said blocks of pixels, wherein said band comprises a predetermined number N of lines of pixels and said M is equal to said predetermined number N.

BRIEF DESCRIPTION OF THE DRAWINGS

A number of embodiments of the present invention will now be described with reference to the drawings, in which:

FIG. 2 illustrates an example of a number of linked lists and a memory management table used in the raster image processing system of FIGS. 1A and 1B;

FIGS. 5A and 5B show a block diagram of the image compression module 406 of the rendering pipeline of FIG. 4;

FIG. 7 shows a Table indicating the partitioning of the 8×8 DCT blocks of transform coefficients;

DETAILED DESCRIPTION INCLUDING BEST MODE

Figure 1A:
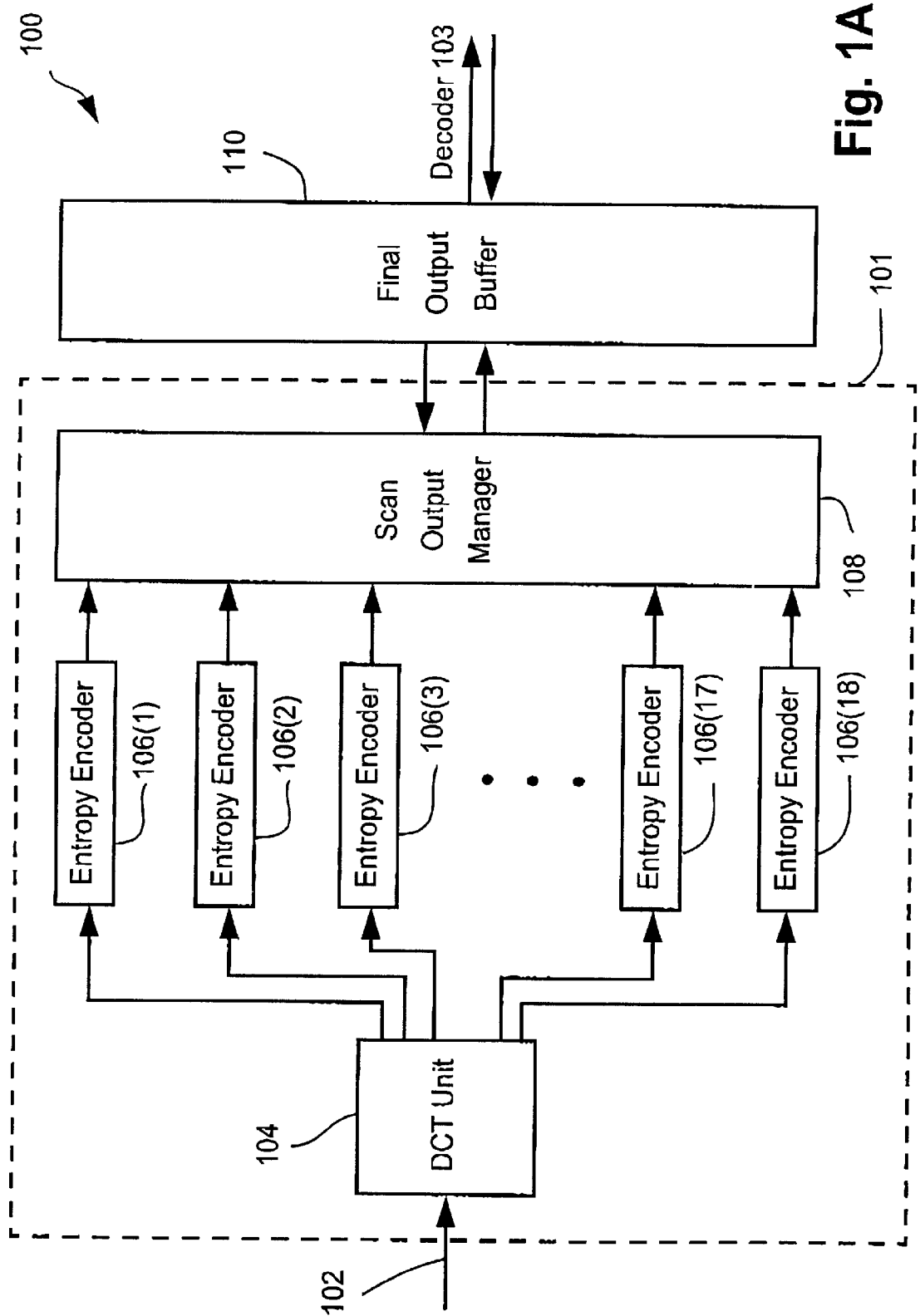
FIGS. 1A and 1B are a schematic diagram of an overview of all raster image processing system.

Where reference is made in any one or more of the accompanying drawings to steps and/or features, which have the same reference numerals, those steps and/or features have for the purposes of this description the same function(s) or operation(s), unless the contrary intention appears.

The principles of the arrangements described herein have general applicability to image compression. However, for ease of explanation, the arrangements are described with reference to image compression used in a color raster image processing system. However, it is not intended that the present invention be limited to the described arrangements. For example, the invention may have application to any arrangement utilising compression where memory resources are limited.

First Arrangement

The first arrangement is an application specific integrated circuit (ASIC). It may equally be implemented as a sub-component of a larger ASIC system, discrete logic, or any mixture thereof the first arrangement may also be practiced as a software program operating a general purpose-processing unit or as a sub-component of a larger software system.

Figure 1B:
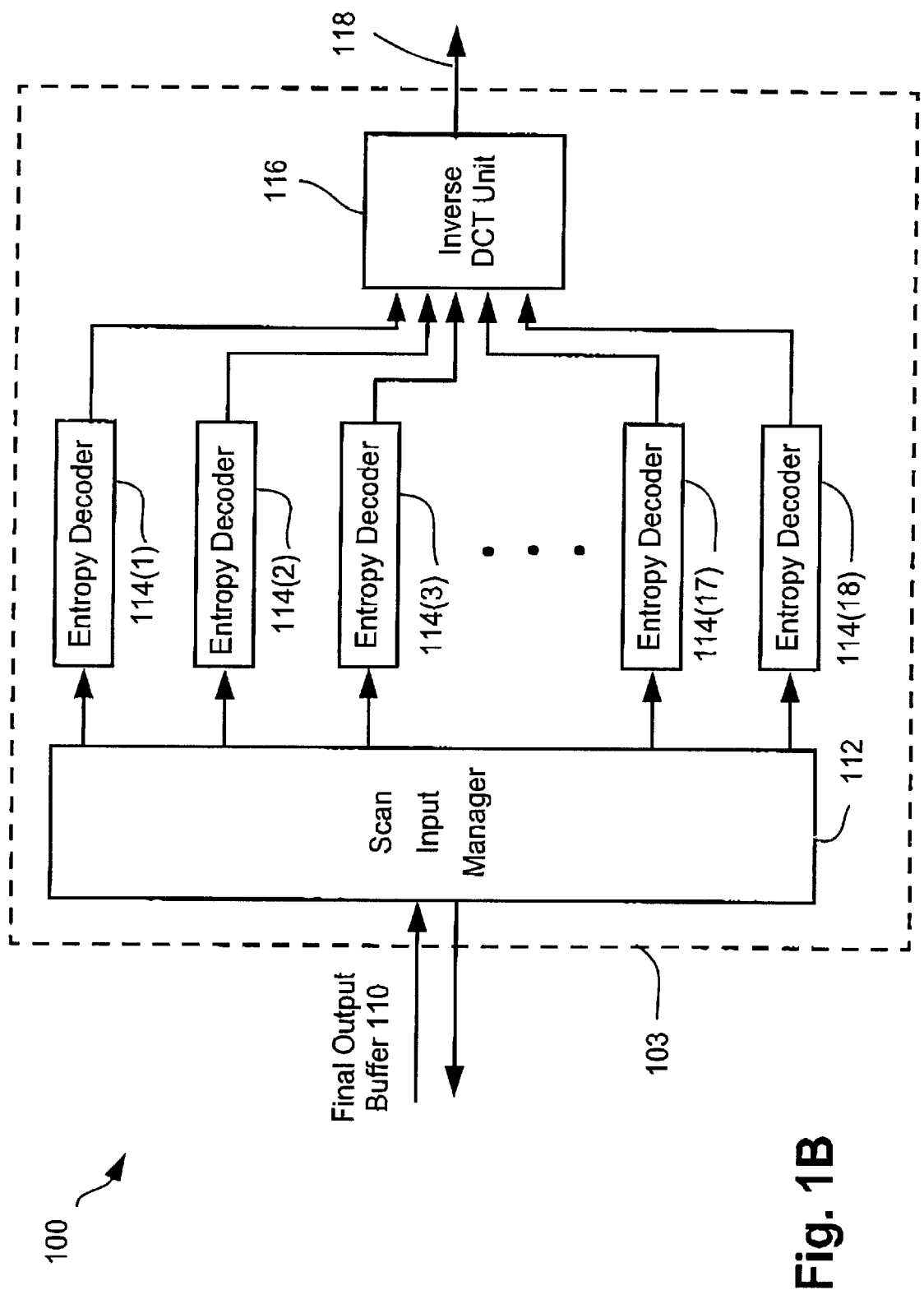

Turning now to FIGS. 1A and 1B, there is shown a first arrangement 100 of a raster compression system. The arrangement 100 comprises an encoder 101, a final output buffer 110, and a decoder 103. The encoder 101 comprises a discrete cosine transform (DCT) unit 104 for accepting color raster image data 102, at least one entropy encoders 106 for entropy encoding the transform coefficients produced by the DCT unit 104, a scan output manager 108 for managing the storing of the transform coefficients in the final output buffer 110 of fixed memory size.

Preferably, the DCT unit 104 can be any known DCT unit, which operates in conformity with the JPEG standard. Alternatively a lossless DCT can be used. A lossless DCT transforms integer pixels to integer transform coefficients. The color raster image data 102 is typically organised as three channels representing one luminance component (Y), and two chrominance components (Cb and Cr), with 8 bits of precision per channel, (referred to as YCbCr), although other encodings such as one red, one green and one blue channel can also be used. The DCT unit 104 buffers the color raster image data 102 for each channel so as to operate on 8 pixel by 8 pixel blocks of channel data. This is preferably done by buffering 8 scan-lines of each channel data followed by the sequential processing of each 8 by 8 pixel block in the buffered scan-lines.

The first arrangement 100 of the image processing system follows a particular mode of progressive JPEG. If a lossless DCT is employed the arrangement 100 is not strictly speaking conformant to the JPEG standard. However, a lossless DCT system differs only in the transform from JPEG. Further other alternatives are possible. A particular mixture of the progressive modes of successive approximation and spectral approximation is used by the first arrangement 100.

The DCT unit 104 performs a discrete cosine transform on each channel of each block of image data as used in the JPEG standard. The resultant transformed data is preferably quantized according to the JPEG standard. For the purposes of this description, the quantiser is taken to be incorporated in the DCT unit 104 and is not shown. Preferably the quantization table for each component is a "flat" table where each entry consists of the value 4. However other quantization tables are possible. As an example a quantization table where the DC value is 2 for each component, and is 4 for the AC values for each component. In another example the DC value is 2 for each component, the AC values for the luminance component are 4, while for the chrominance components the AC values are 8. If a lossless DCT is employed the quantization step is optional, as the DCT coefficients are already integer values.

The quantized blocks and then converted to descriptors, which are entropy encoded in scans by the entropy encoders 106 in accordance with progressive JPEG. Preferably, the entropy encoders 106 are Huffman entropy encoders. The DCT unit 104 splits the descriptors into bit streams in accordance with the scans as described in the Scan Table shown below. Each row in the table specifies one (encoding) scan. The scans are encoded in row order. The components column specifies which components are encoded in the scan. Component 0 is the Y component, component 1 Cb and component 2 Cr. For example, the first row specifies that all three components are encoded in the first scan. The Ss-Se column specifies the start (Ss) and end (Se) index, following a JPEG zigzag sequence of DCT coefficients, of a contiguous sub-sequence of DCT coefficients that are encoded in the scan. Thus for example the second row of the table specifies that in the second scan DCT coefficients 1 to 63 are encoded: that is all coefficients except the DC coefficient. The Ah:Al column specifies the bit precision high and bit precision low parameters respectively used in the successive approximation mode of progressive JPEG. In the first scan for a coefficient Ah is set to 0 as in the first 4 rows in the scan table.

The successive approximation mode of JPEG defines two slightly different point transforms. The use or purpose of the point transform is to essentially partition the coefficients by bit-plane. However, depending upon the point transform the result may or may not correspond to a bit-plane. Nevertheless, the term bit-plane is used herein to refer to a partition resulting from a point transform.

To elucidate upon the scan definition, the scans of the Scan Table are explained more explicitly. In the first four scans the data from bit-planes 2 and above are included only. The bit-planes are numbered consecutively from the least significant bit-plane (zero bit-plane). This is specified by the Ah:Al=0:2 pair. The parameter Al=2 specifies that bit-plane 2 is the lowest bit-plane included, while the parameter Ah=0 specifies that this is the first partition of the bit-planes, and hence to include all bit-planes above Al inclusive. Scan 1 comprises the DC coefficient (scan index 0) for each component (Y, Cb, and Cr). That is bit-plane 2 and above for each DC coefficient is included in this scan. Scan 2 comprises the bit-plane data for all bit-planes above Al inclusive for all AC coefficients (coefficients 1–63) for the Y component (component 0). Similarly, Scan 3 comprises the same for the Cr component (component 1). Similarly, Scan 4 comprises the same for the Cb component (component 2). In Scan 5 a new Ah:Al=2:1 pair is used. This pair specifies that bit-plane Al=1 is transmitted in this scan. Thus in Scan 5 the bit-plane 1 of the DC coefficient for each component is included. In Scan 6 bit-plane 1 for AC coefficients 1 to 5 for the Y component is included. Similarly in Scan 7 bit-plane 1 for AC coefficients 1 to 5 of the Cr component is included, and so on. In Scan 12 a new Ah:Al=1:0 pair is used. This pair specifies that bit-plane Al=0 is transmitted in this scan. Thus in Scan 12, the bit-plane 0 of the DC coefficient for each component is included. In Scan 13 bit-plane 0 for AC coefficients 1 to 5 for the Y component is included, and so on.

Scan Table

| Components | Ss-Se | Ah:Al |
|---|---|---|
| 0, 1, 2 | 0–0 | 0, 2 |
| 0 | 1–63 | 0, 2 |
| 2 | 1–63 | 0, 2 |
| 1 | 1–63 | 0, 2 |
| 0, 1, 2 | 0–0 | 2, 1 |
| 0 | 1–5 | 2, 1 |
| 2 | 1–5 | 2, 1 |
| 1 | 1–5 | 2, 1 |
| 0 | 6–63 | 2, 1 |
| 2 | 6–63 | 2, 1 |
| 1 | 6–63 | 2, 1 |
| 0, 1, 2 | 0–0 | 1, 0 |
| 0 | 1–5 | 1, 0 |
| 2 | 1–5 | 1, 0 |
| 1 | 1–5 | 1, 0 |
| 0 | 6–63 | 1, 0 |
| 2 | 6–63 | 1, 0 |
| 1 | 6–63 | 1, 0 |

The DCT unit splits the DCT blocks into these scans and outputs these scans as bitstreams such each bitstream scan contains data from each DCT block in raster block order.

Preferably, each bitstream scan is encoded by a respective Huffman entropy encoder 106(1), 106(2), . . . , 106(17), and 106(18). Except for the first scans, each respective Huffman entropy encoder 106(5), . . . , 106(18) considers an independent bit-plane of the transformed data. A set of 18 Huffman entropy encoders 106(1), 106(2), . . . , 106(17), and 106(18) is preferably used, one for each scan. However fewer Huffman coders may be used, whereby one Huffman coder encodes several scans. For example, one Huffman order could be used to encode the first four scans, another the next 7 scans and so on. Although several scans may be encoded by one Huffman encoder, each scan can generally be a separate Huffman table.

The arrangement of scans is such that the Huffman entropy encoders 106 are considering separated streams of data that differ in their perceptual contribution to the resultant image. In this case the first Huffman entropy encoder 106(1) considers the perceptually most significant contribution and the last Huffman entropy encoder 106(18) the perceptually least significant, with the others ordered in between these two extremes.

In the first arrangement 100 perceptual scans are achieved by encoding bit planes separately. For the first scans 1 to 4, multiple bit-planes of each coefficient are effectively coded together. For the remaining scans, each bit plane is separated into three scans one for the DC coefficient, one for coefficients 1 to 5 and one for the remaining AC coefficients (coefficients 6–63). The DC coefficient is the most important, visually, for a given bit plane, then coefficients 1 to 5 are next, and then coefficients 6 to 63. In order to achieve a finer degree of perceptual separation each bit plane is separated into more than one scan.

The Huffman codewords are output into a bit-stream that is shifted into an output buffer of the entropy encoder 106. This output buffer is 32 bytes or some similar size selected to allow a fraction of the buffer to be efficiently transferred through the memory sub-system used to access the final output buffer 110. There is one output (bit) stream corresponding to each encoded scan.

The set of entropy encoder 106(1), . . . , 106(18) output buffers are able to be read by a scan output manager 108. This scan output manager 108 is signaled by each entropy encoder 106(1), . . . , 106(18) each time the entropy encoder 106(1), . . . , 106(18) fills enough of its output buffer to allow a transfer of the data to the final output buffer 110.

The scan output manager 108 has random access to the final output buffer 110. The final output buffer 110 is typically implemented with DRAM, SDRAM or RDRAM memory, but other schemes are possible.

The scan output manager 108 maintains a table in internal memory with four entries for each scan. In the first arrangement the 18 scans are coded by respective entropy encoders 106(1), . . . , 106(18). An example of such a table 200 is shown in FIG. 2. These entries are:
1. A linked list root address 204. This is the address in the final output buffer 110 of the first of a linked list of blocks that contain the entropy encoded data of this stream.
2. A current block address 206. This is the address in the final output buffer 110 of the last block in the linked list and is the block that is currently being filled.
3. A fill index 208. This is a count of how many words of entropy encoded data have so-far been written into the current block and is thus also the index at which new data will be written.
4. An active flag 210. This flag indicates whether this entropy encoded stream is still to produce data versus the stream has been stopped.

The scan output manager 108 also holds in a free block register 212 the address in the final output buffer 110 of the first block of a linked list of free blocks that are not currently assigned to any active entropy encoded stream.

Figure 3A:
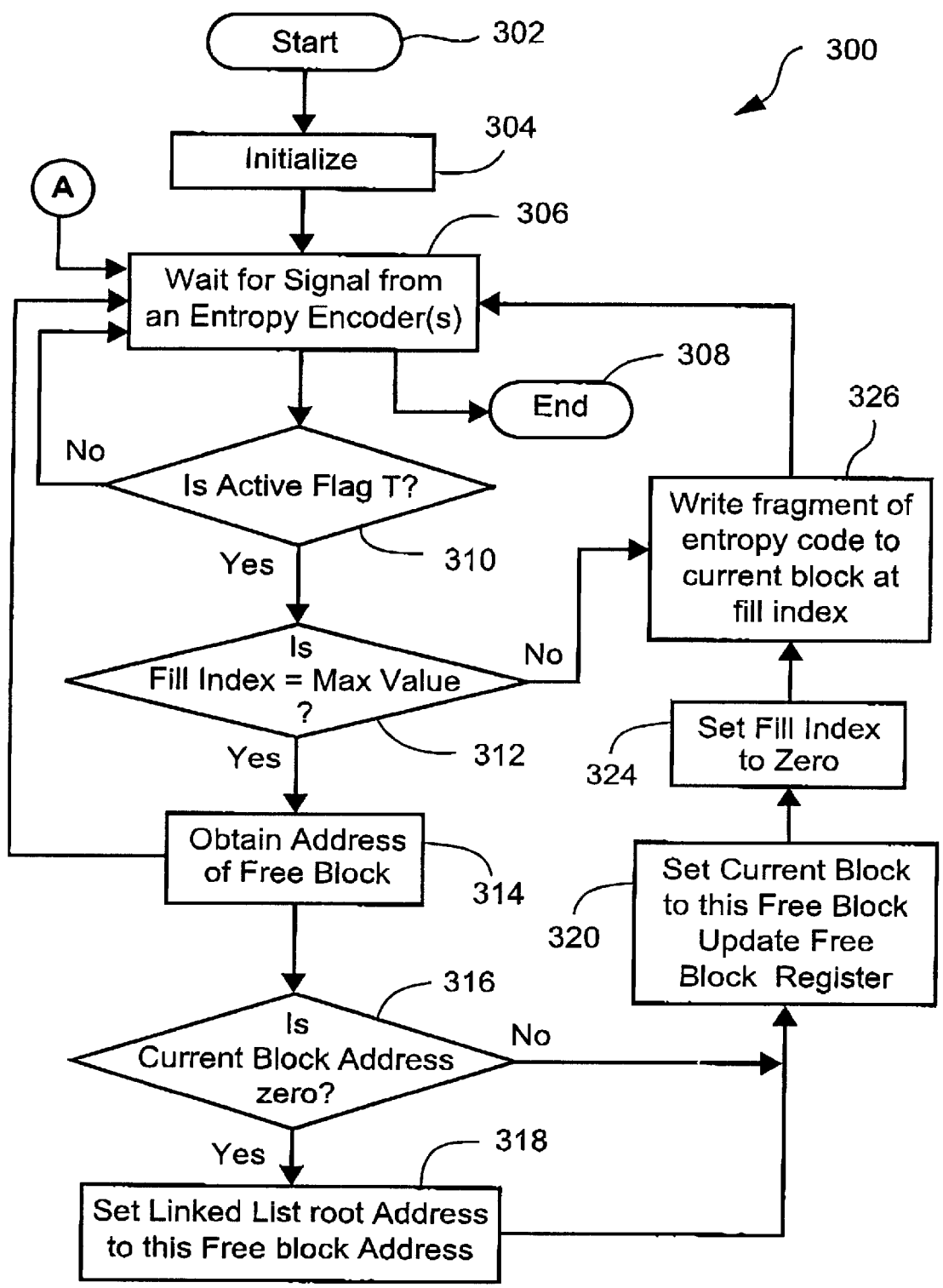
FIGS. 3A and 3B show a flow chart of a method of managing the storing of compressed image data in the output buffer 110 of fixed memory size.
Figure 3B:
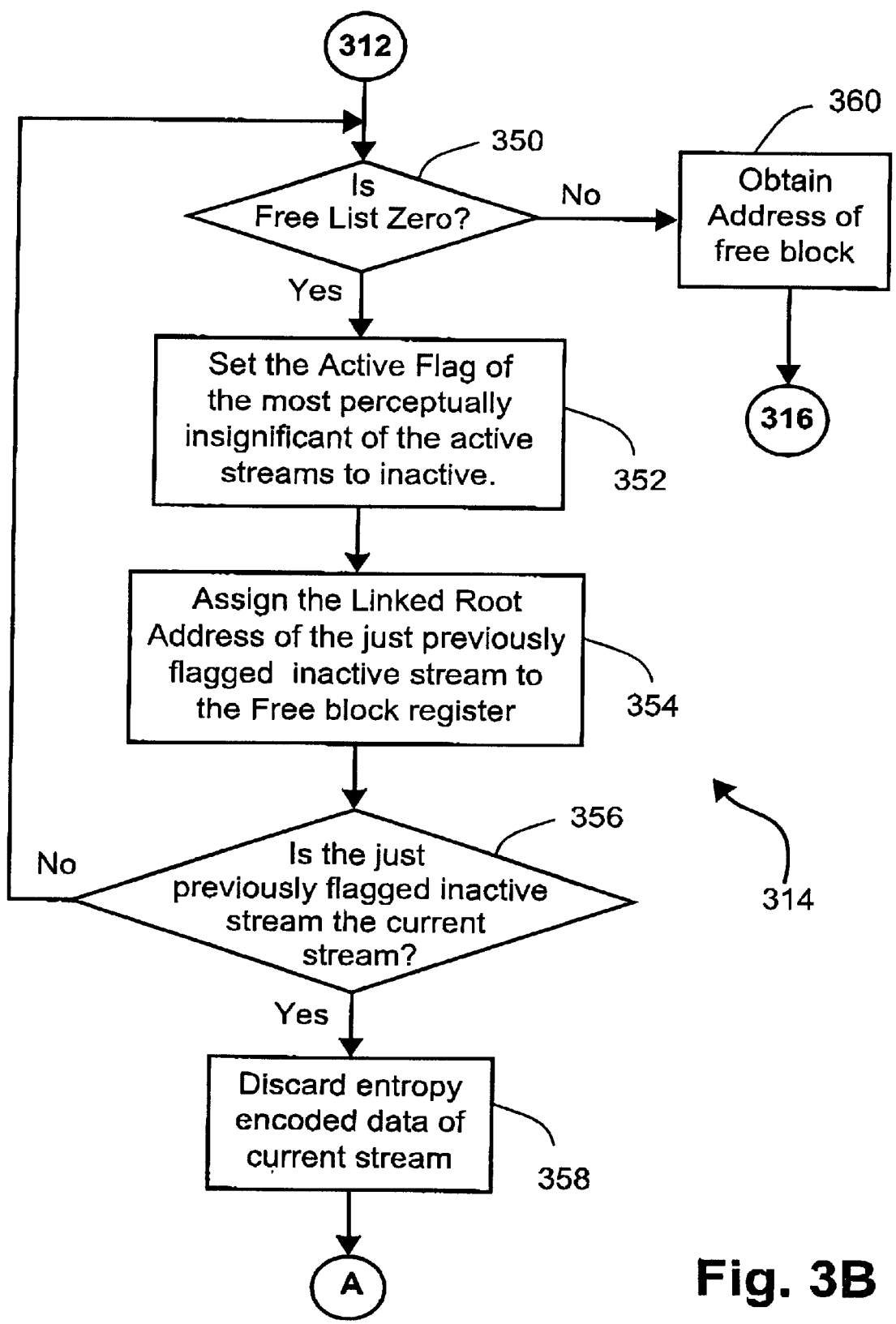

Turning now to FIGS. 3A and 3B, there is shown a flow chart of a method of managing the storing of compressed image data in the output buffer 110 of fixed memory size. This method is performed by the Scan Output Manager 108, which is preferably implemented as a component of the application specific integrated circuit (ASIC) of the first arrangement 100. The scan output manager 108 may also be practiced as a software program operating as a sub-component of a larger software system implementation of the first arrangement 100. The method 300 performed by the scan output manager 108 commences when the encoder 101 commences the encoding of the color raster data 102. The scan output manager 108 then undertakes a initialisation process where:
The entire final output buffer 110 is divided into blocks that form a free list. Alternatively this may also be done implicitly as blocks are first needed. Also, memory is set aside at the head of the final output buffer 110 for subsequent storage of information concerning each scan stream. This information includes for each scan stream its scan stream number and its corresponding linked list root address (if any).
Each active flag 210 of the memory management table 200 is set to indicate that the corresponding entropy encoded scan stream is active.

Each linked list root address and each current block address of the memory management table 200 is set to zero.

Each fill index of the memory management table 200 is set to the value that indicates the block is full.

After initialisation, the scan output manager 108 then proceeds to an idle state 306, where it waits for a signal from an entropy encoder. Each time the scan output manager 108 is signalled that a fragment of entropy encoded data is available on a particular scan stream (hereinafter called the current scan stream), it considers 310 the active flag of that stream. If the corresponding active flag entry of the memory management table 200 indicates that the current scan stream is stopped (i.e. false), the scan output manager 108 discards the fragment of entropy encoded data and returns to its idle state 306. Otherwise, the scan output manager 108 considers 312 the fill index entry of the current scan stream in the memory management table 200.

If the fill index entry of the current scan stream is not equal to the maximum allowed value, the scan output manager 108 proceeds to step 326. On the other hand, if it is equal to the maximum allowed value, the scan output manager 108 obtains 314 the address of a free block using a sub-process as described below with reference to FIG. 3B. The scan output manager 108 then considers 316 whether the current block address entry of the current scan stream in the memory management table 200 is zero. If it is zero, then the linked list root address entry in the memory management table 200 for the current scan stream is set 318 to this free block address. Furthermore, the current block address entry in tho memory management table 200 for the current scan stream is set 320 to this free block address. On the other hand, if the current block address is not zero, then the scan output manager 108 proceeds directly to step 320, where the current block address entry is set to this free block address. After the current block address entry is set 320 to this free block address, the scan output manager 108 updates 320 the free block register to the address of the next free block in the linked list of free blocks. If there are no more free blocks available in the linked list of free blocks the scan output manager 108 sets the free block register 212 to zero. The scan output manager 108 then sets, at step 324, the fill index entry of the memory management table 200 to zero. After completion of step 324, the scan output manager proceeds to step 326.

During step 326, the fragment of entropy encoded data is written by the scan output manager 108 into the final output buffer 110. This data is written to that location in the current block indicated by the current block address entry and fill index entry in the memory management table 200 corresponding to the current scan stream. After the data is written, the fill index entry corresponding to the current scan stream is incremented to account for the new data. The scan output manager 108 then returns to its idle state 306. The operations of the scan output manager 108 are terminated upon instructions from a higher level software application (not shown) in the case of a software implementation or a controller (not shown) in the case of a hardware implementation. Prior to termination, the scan output manager 108 stores in the final output buffer 110 the information indicating for each scan stream its scan stream number and its corresponding linked list root address (if any).

Turning now to FIG. 3B, there is shown a flow chart of the sub-processes of step 314 of FIG. 3A. If the fill index entry of the current scan stream is equal to the maximum allowed value, the scan output manager 108 considers 350 whether the free block register is zero. If the free block register is not zero, the scan output manager 108 obtains 360 the address of this free block stored in the free block register 212 and proceeds to decision block 316. During this step 360, the scan output manager 108 also updates the free block register 212 by assigning the address of the next free block in the linked list of free blocks to the free block register 212. If there is no next free block in the linked list of free blocks, the scan output manger 108 sets the free block register 212 to zero.

On the other hand, if the scan output manager 108 determines 350 that the free block register 212 is zero the scan output manager 108 sets 352 the active flag entry in the memory management table 200 of the most perceptually insignificant of the active scan streams to inactive. The scan output manager 108 then assigns 354 the linked root address of the just previously flagged inactive scan stream to the free block register 212. Once the free block register 212 becomes non-zero, that address is used as the address of the next free block. The scan output manger 108 then considers 356 whether the just previously flagged inactive scan stream is the current scan stream.

If the entropy encoded stream that just became inactive is the current scan stream, the fragment of entropy encoded data is discarded 358 and the scan output manager 108 returns to its idle state 306. Otherwise, the scan output manager returns to decision block 350, where once again the scan output manager 108 determines 350 whether the free block register is zero.

The scan output manager 108 is able to detect that the final output buffer 10 is full by determining 350 that the free block register 212 is zero. In this situation, the scan output manager 108 by then assigning 352 the linked root address of the most perceptually insignificant scan stream to the free block register, allows data of a more perceptually significant scan stream to simply overwrite the most perceptually insignificant scan stream. In this way, the arrangement 100 performs a simple one-pass processing for fitting the compressed data into the final buffer of fixed memory size. The scan output manager 108 allocates the same scan, for example scan 18, of each DCT block to the same linked list. Thus when the scan output manager 108 assigns the linked root address of the most insignificant scan stream to the free block register, it is effectively discarding from storage in the final output buffer 110 the same most perceptually insignificant scans of all the DCT blocks. Thus the perceptual degradation introduced to achieve compression of a fixed size is applied consistently to the whole image.

The operation of the scan output manager 108 is illustrated by the following pseudo code:

```
struct block
{
    struct block    *next;
    word            data[1000];
};
struct stream
{
    struct block    *head;
    struct block    *current;
    int             fill_index;
    bool            active;
};
struct stream   streams[18];
struct block    *free_root;
int             n_active;
void
emit_entropy_encoded_data(int s, word data)
```

-continued

```
{
    if (!streams[s].active)
        return;
    if (streams[s].fill_index == 1000)
    {
        while (free_root == NULL)
        {
            --n_active;
            free_root = streams[n_active].head;
            streams[n_active].active = false;
            if (n_active == s)
                return;
        }
        if (streams[s].current == NULL)
            streams[s].head = free_root;
        else
            streams[s].current->next = free_root;
        streams[s].current = free_root;
        free_root = free_root->next;
        streams[s].current->next = NULL;
        streams[s].fill_index = 0;
    }
    streams[s].current->data[streams[s].fill_index] = data;
    ++streams[s].fill_index;
}
```

The compressed image bit stream as it resides in the final output buffer 110 may not comply with the JPEG standard. This is the case because of the way the scans are kept as independent bit streams, as managed by the scan output manager 108, and not formed into one contiguous bit stream. However the linked list information describing the scan structure in the final output buffer 110 is maintained with the compressed image for decompression, thus the JPEG compressed bit stream can be reconstituted from this link list information and scan structure.

As an image is being compressed in substantially raster (or 8-line raster) order, the scan output manager 108 ensures that the compressed image bit stream does not overflow the output buffer 110. Should the buffer 110 become full at any stage before encoding is complete, the scan output manager 108 discards the least perceptually significant scan that remains in the buffer 110, thereby reclaiming buffer space for remaining portions of the compressed image bit stream. In this way several scans may be discarded during encoding. Any scans discarded during encoding are not part of the final compressed image bit stream.

In the case where a lossless DCT is employed, if no scans are discarded the compressed image bit stream represents the input image without loss. That is the compressed image bit stream can be decompressed to give the original input image.

Regardless of which transform is employed, should a compressed image bit stream, consisting of all scans, be too large for the output buffer 110, the scan manager 108 ensures that the least perceptually significant scans are discarded. In this way the final compressed image bit stream consists of the perceptually most important scans, fits into the output buffer 110, and is formed in one pass in substantially raster order.

Corresponding to each scan is a compressed image. For a given scan the corresponding compressed image is the image represented by the given scan and all previous scans. Thus corresponding to the sequence of scans is a sequence of compressed images. For increasing sequence number the compressed image quality increases, while the compressed image size increases. The compression method in effect selects the largest compressed image (or highest quality compressed image) that fits into the buffer 110. That is the next larger compressed image in the sequence after the selected compressed image does not fit in the buffer 110. There is some redundancy in the sense that the final compressed image, will not, in general, totally fill the buffer 110. In order to minimise this redundancy it is desirable to have a sequence with fine granularity. That is the increase in size from one scan to the next is small. This suggests a lot of scans. However the more scans that are used the more complicated the encoding process, so there is a trade off.

There is another consideration in the design of the scan partition that can be phrased in several different ways. One way is that each scan should maximise the increase in the compressed image quality for a given size increase (of compressed image). A related way is that each scan should minimise the size increase for a given increase in compressed image quality. There are other ways that are between these two. The first way is used here for the purposes of discussion, but other ways are equally applicable.

The aim of the scans is therefore two-fold. One is that each should maximise the increase in quality for a given size increase, and that the other is that the size increase is not too large.

In order to achieve this aim in an efficient manner it is desirable to partition the coefficients by magnitude (instead of by frequency alone) when designing the scan partition. A magnitude partition is achieved here by coding different bit-planes in different scans, but other magnitude partitions are possible. For example, in a scan the bits in bit-planes 2 and above are encoded for a set of coefficients. In a later scan (or scans) the bits in bit-plane 1 are encoded for the same set coefficients, and in a later scan (or scans) the bits in bit-plane 0 are encoded for the same set of coefficients. Partitioning by frequency alone means the quality increase for a given scan is not always as large as it could be relative to the size increase. Further, when partitioning the scans by frequency alone, it is difficult to achieve a sufficient number of scans to reduce the redundancy referred to above, without compromising the compression efficiency, due to the nature of the JPEG coding method. In the present arrangement, the scans as shown in the above mentioned Scan Table is preferable.

Other perceptual scan separations are possible than those described above. For example, a different scan ordering whereby scans consisting of AC coefficients 1–5 are placed before those for the DC coefficient for a given bit-plane could be used. That is, for example, in the scan order defined by the scan table, the scan 5 would be moved to come after scan 8. For a more general example of different scans, different selections of the Ss and Se boundaries, or a different interleaving of Ah and Al values for the different components and spectral segments could be used.

As another example a binary arithmetic coder could be used to encode the bit-planes using the sub-bit plane or multi-pass approach of the draft JPEG2000 standard published in document "Information Technology—JPEG 2000 Image Coding System—JPEG 2000 Committee Draft version 1.0, Dec. 9, 1999" (hereinafter referred to as JPEG2000. JPEG2000 uses a multi-level discrete wavelet transform (DWT). A scan partition where each level of DWT coefficients contribute to a separate scan could be used (the DC subband alone would contribute to a separate scan as well). Further, for a given level each bit-plane could contribute to a separate scan. (The bit-plane partition could even occur within a bit-plane after one of the (three bit-plane) passes of JPEG2000. In this way as well a bit-plane could be partitioned into more than one scan). The scans would then be ordered dominantly by bit-plane and then by DWT level.

That is for a given bit-plane the DC subband scan would be followed by the highest level scan for the same bit-plane, and then scans for decreasing DWT levels for the same bit-plane. Then the scan for the DC subband at the next lower bit-plane and so on. Many other variations on this basic order are possible. For example a given bit-plane may be included in the scan sequence before a higher bit-plane for higher frequency subbands. The disadvantage of such an arrangement based on JPEG2000, is the significantly greater complexity required for implementation. In particular extra input line buffering, necessitating off chip storage, and higher bandwidth between off and on chip memory, is typically required. Further, the entropy coder is significantly more complicated than the simple form of entropy coding used in JPEG. The cost therefore, to achieve a real time throughput is substantially greater. Further, compatibility with JPEG, and the ability to transcode to baseline JPEG is lost.

Returning now to FIGS. 1A and 1B, the decoder 103 takes the compressed image from the final output buffer 110 and reconstructs the image. The decoder 103 comprises a scan input manager 112 for retrieving each compressed scan from the output buffer, entropy decoders 114(1), ..., 114(18) for decoding the scans, and a inverse DCT unit 116 for combining the scans into a block of transform coefficients and for performing an inverse discrete cosine on the decoded block. The image is decoded in substantially raster scan order, producing preferably 8 output pixel lines at once, commensurate with the usual decoding order of baseline JPEG. Each quantized DCT block is decoded from the compressed scans in block raster order. Preferably there are 18 Huffman decoders 114(1), ..., 114(18) each working substantially in parallel. As with the encoder using fewer Huffman decoders is also possible. The Huffman decoders are staggered so that a Huffman decoder decoding bits at a lower bit plane has available the necessary information from higher bit planes (decoded from a Huffman decoder) to decode each coefficient in the scan. Each Huffman decoder is fed the necessary compressed data from a scan input manager 112. Tie scan input manager 112 first retrieves the linked list information from the final output buffer 110. From this information, the scan input manager 112 is able locate the scans in the final output buffer 110 and output the scans to their respective Huffman decoders. In the event where perceptual insignificant scans are not present in the final output buffer 110, the scan input manager 112 instructs the inverse DCT unit 116 which pads these scans with zeroes. Preferably the entropy decoders 114 are adapted to distinguish between DCT blocks in a similar manner to the JPEG baseline manner. When the entropy decoding of the coefficients of a given block is complete the block is inverse quantized as necessary and inverse transformed with an inverse DCT to give a reconstructed image block 118.

As an alternative form of, a baseline JPEG decoder, with a minor modification could be used to decode the image. In this case it is necessary to trans-code the compressed image as represented by the 18 independent scans in the output buffer to substantially a form of baseline JPEG. This can be done in one pass through the compressed data, as described above for decoder 103 up to the stage just before the inverse DCT. Instead of performing the inverse DCT the block coefficients are encoded in accordance with baseline JPEG and are output back to the output buffer. By freeing each block of the linked lists as the scans are decoded and a small amount of intermediate buffering new baseline code can be written out to the output buffer as the image is trans-coded.

Second Arrangement

A second arrangement is now described with reference to FIGS. 1A, 1B, and 2, and FIGS. 4 to 9.

The first arrangement already described may form a part of a rendering pipeline. A typical rendering pipeline consists of a data source, a raster image processor, a color conversion stage, and some form of half-toning to create output suitable for the printer engine. The typical rendering pipeline also includes buffer memory to ensure that data is available to the printer engine in real time. It is advantageous if said memory contains compressed data, however it is also a requirement of such systems that the compressed data must be guaranteed to fit into the available memory.

Figure 4:
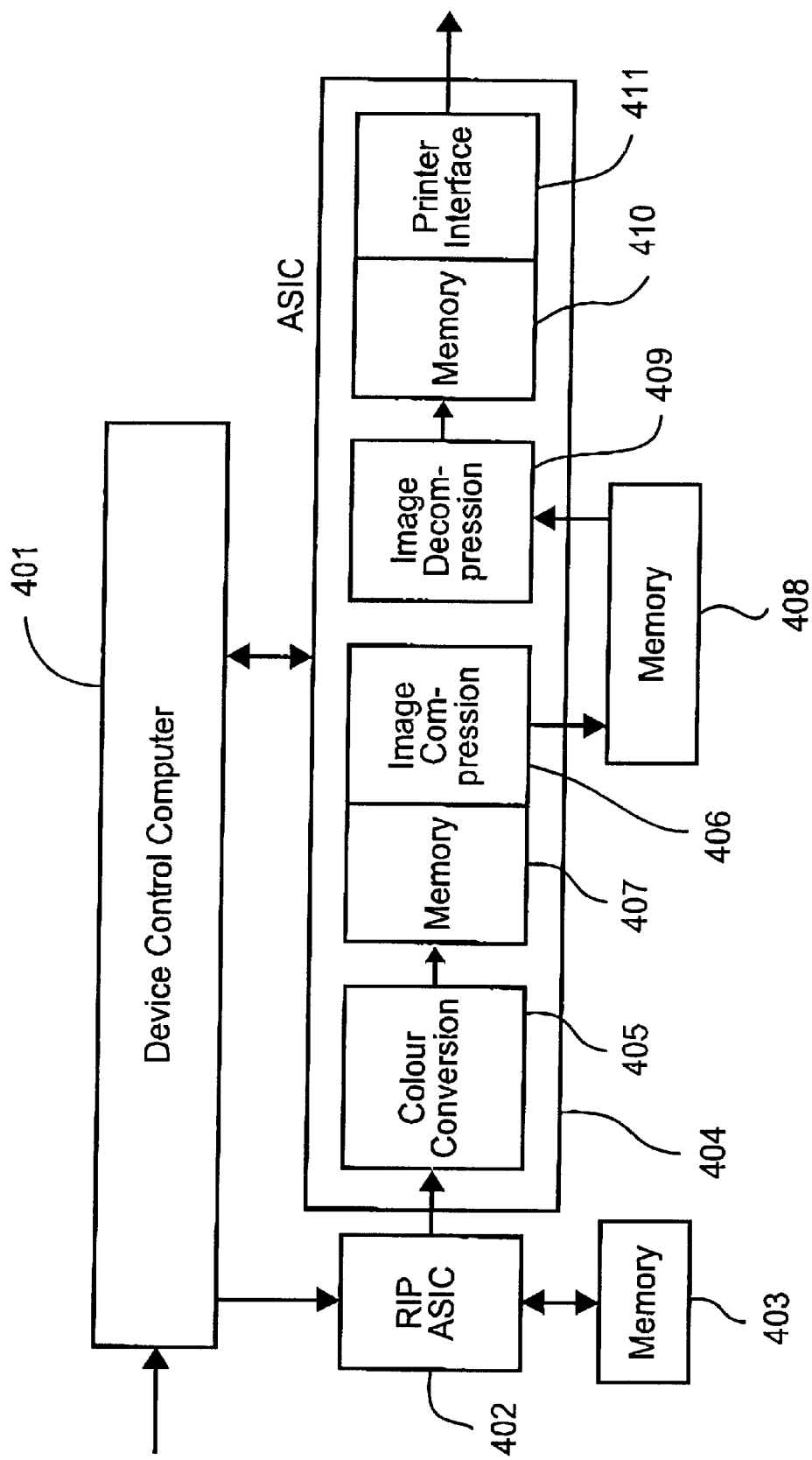
FIG. 4 shows a block diagram of a rendering pipeline.

The second arrangement described here is shown in FIG. 4. It consists of general purpose computer 401, a raster image processor 402 with associated memory 403, and an ASIC 404, with associated memory 408.

The general purpose computer 401 is used to control the devices within the system. Its tasks are to load the internal memory tables of the ASICs 402 and 404, accept rendering jobs from the input and load them into the RIP memory 403, and handle any error condition reported by the printer engine.

The ASIC 404 comprises four modules, a color space conversion module 405, an image compression module 406, an image decompression module 409, and a printer interface module 411 coupled in a pipeline manner. The image compression module 406, memory 408, and image decompression module 409 essentially corresponding to and performing the functions of the encoder 101, final output buffer 110, and decoder 103 respectively. The major differences between the first and second arrangements being they operate in different color space domains and have different scan partitions. The image compression module 406 and image decompression module 409 will be described in more detail below with reference to FIGS. 4 to 9.

The first module 405 is a module for color space conversion from the rendering color space to the ink values of the printer engine. This module accepts color data in raster order from the raster image processor 402, and converts each pixel color into ink values, in the received order. Typically there are four ink values for each pixel, one each for Cyan, Magenta, Yellow and Black inks, however other arrangements using more inks are possible. Methods for performing the conversion to ink values are well known in the art. The ink values are stored into a small buffer 507 in the image compression module 506, sufficient to store 16 scanlines of ink values in a double-buffered arrangement (i.e. two banks of 8 scanlines). Preferably this buffer is in on-chip memory. Using memory on chip for buffering data is advantageous because this allows much faster access than using memory off-chip. However, on chip memory is typically more expensive, so only moderate amounts of data can be buffered on chip at a reasonable cost.

The second module 406 is an image compression module that emits compressed data to an image buffer 408. This compression is performed after the conversion into ink values, because this arrangement allows separate and independent compression and decompression of the various ink value channels. This is advantageous because common printer engines print different ink colors in separate passes over a print head. Alternatively, other print engines print in a single pass, using several non-coincident print heads. In either of these cases the ink values for the different channels of a single pixel are required at different times.

The third module 409 in the pipeline is an image decompression module, which decompresses ink values from the image buffer 408 to a small internal buffer 410 in the order in which they are required by the printer engine. The small internal buffer is sufficient to store 16 scanlines of ink values, and uses a double buffered arrangement to ensure that ink value data is provided to the engine interface at the rate required by the printer engine.

The fourth module 411 in the pipeline is the printer interface, which performs the handshaking required by the printer engine, and reads the ink values from the intermediate buffer 410. The printer interface module 411 may also process ink-value data into a form suitable for output to the printer engine (not shown), such as dithering 8-bit values down to 1 or 2 bit values, if required. Such processing uses methods that are well known in the art.

Figure 5B:
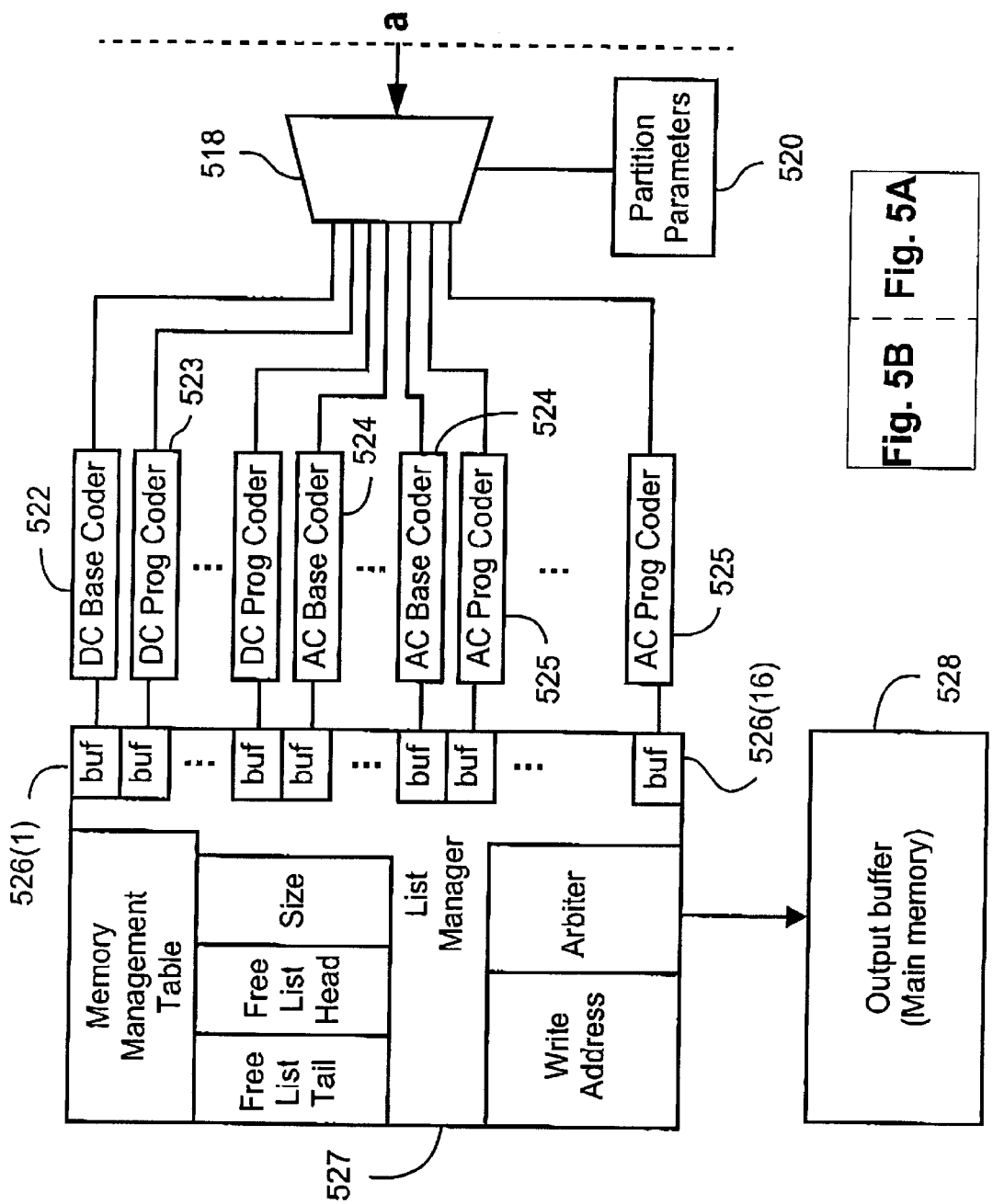

Turning now to the second module 406, the image compressor for a channel is as shown in FIGS. 5A and 5B. The data entering the module 406 is stored in a double buffer 510, arranged so that while data is being read from one buffer by the image compressor, data from the color space conversion module 405 is being written into the other. When all of the data in said first buffer has been compressed, the image compressor waits for the other buffer to fill with data and the buffers are swapped. After the buffers are swapped, the image compressor reads from the buffer which was previously being written, and data from the color conversion module is written into the buffer which was previously being read from. Because the discrete cosine transform unit in the compressor reads data in 8×8 blocks, hereafter referred to as minimum coded units or MCUs, each of the said buffers have space for at least 8 scanlines worth of pixel data of the image.

A register 504 is provided in which is stored the number of pixels in a scanline of data. This is used for two purposes. Firstly, given the address of a pixel in one scanline, the address of the corresponding pixel in the next scanline can be calculated by simply adding the scanline length multiplied by the size of a pixel to the current address. A counter 502 is provided to count the number of MCUs, and hence the address of the first pixel of each MCU on the first scanline. By extension, the address of the corresponding pixels in all of the remaining scanlines required for the MCU of 8×8 pixels can be so obtained. The address generator 508 uses an index counter 506, to count pixels within the MCU, and calculate the address as follows:

$$\text{Address}=Bpp*(MCU<<3+(IX>>3))*\text{Scanline}+IX\%8),$$

Where Bpp is the number of bytes per pixel, MCU is the value in the MCU counter 502, IX is the value in the index counter 506, and Scanline is the scanline length stored in the register 504.

Secondly, in the final block of pixels on each scanline, there may not be 8 pixels remaining in the scanline. In the Pad MCU module b12, the scanline length value and said MCU counter are used to determine which datum is the final pixel in each scanline, and how many extra pixels are required on each scanline to make up a full MCU. The ink values of the final pixel on each scanline are used to pad out the remaining pixels of the final 8×8 block of pixels on each scanline.

A second register 505 is provided, in which is stored the total number of scanlines in the image. A second counter 503 is also provided, which counts the current number of scanlines which have been encoded. When the final scanline is encountered, the Pad MCU module 512 fills the remaining MCU rows with the ink values from the corresponding pixels in the final scanline.

The data in the buffer being read from is read in minimum coded units, as indicated above. For each channel, each 8×8 block of pixel ink values is passed to the DCT unit 514 for that channel, and a discrete cosine transform is then applied. For each channel, the transform coefficients are written in Zig-Zag order to a 64 entry coefficient buffer 516. In multiplexer 518 the coefficients are partitioned into bit planes and frequency bands, according to the partition parameters 520. The partition parameters 520 may be hard-wired or stored values in registers for the band of frequency coefficients and the bitplane levels which are assigned to each partition. For the low order bit plane partitions, the EOB position is the coefficient which has a bit set in the bit plane, and for which all more significant bits are zero, and this is stored in the EOB register 517.

Referring now to FIG. 7, there is shown a partition into bit planes and frequency bands, as is preferably used for each channel. Preferably, each channel is compressed independently and in parallel with the other channels. Each resulting data stream is streamed into an encoder unit 522, 523, 524, 525. For each of the AC progressive partitions, a marker stream is created in addition to the bit stream. The marker stream bit is set if there is a bit set in any of the higher order bits of the coefficient and clear otherwise.

There are several types of encoding used, chosen according to which data stream is being encoded.

In the DC base encoder 522, the top bits of the DC coefficient (DC band 1) are encoded by taking the difference between the current value and the value for the preceding MCU, said differences being built into a symbol consisting of a Huffman coded SIZE value, which determines the exact number of bits required to specify the difference, and the bits required to fill out the value, separately Huffman coded. Runs of zeroes are built into a distinct symbol containing a code and a runlength value, and Huffman coded.

In the DC progressive encoders 523, the remaining bit planes of the DC coefficient are emitted as-is.

In the AC base encoders 524, the top bits of the AC coefficients (AC band 1, AC band 2, and AC band 3) are encoded using the standard encoding for JPEG AC coefficients. Each non-zero AC coefficient is encoded as (Run, Size, Value) where Run and Size are, respectively, the length of the run of zero coefficients prior to the encoded coefficient, and Size is the number of bits required to fully specify the value. Run and Size are Huffman encoded, while Value is represented by the low order Size bits in the coefficient. If Value is positive, it is emitted as-is, otherwise if Value is negative, 1−Value is emitted. Note that the msb of the appended bit sequence is therefore 0 for negative values, and 1 for positive values. An EOB marker is emitted after the final non-zero coefficient (as previously determined and stored in register 517.

In the AC progressive encoders 525, each non-zero bit which has a corresponding zero in the marker stream is encoded as (Run, Size, bit, correction bits), where Run is the length of the run of zero coefficients with corresponding zeros in the marker stream since the last emitted bit (or the start of the band). The Size value is obviously one for coefficients in the progressive streams. The (Run, Size) value is Huffman coded, and followed by the bit value, and the correction bits for the intervening bits where the marker stream bit was 1, indicating a non-zero history. An EOB run marker is emitted at the previously determined position stored in register 517, and an EOB run count for each block, if required, prior to such (Run, Size, bit, correction bits) code, This code is then followed by the correction bits for the remainder of the stream: correction bits are only emitted for coefficients where a marker bit is set. Note that often there are no emitted runs before the EOB marker and the correction bits.

The list manager module 527 includes a buffer 526 for each data stream from the coders 522, 523, 524, and 525. These buffers use a double buffer arrangement so that when one half of the buffer is filled, it can be written out to the main memory 528 while data is being streamed into the other half of the buffer 526. Referring to FIG. 2, the list manager module includes a memory management table 200, which has an entry for each data stream in the system.

The free list 212 is allocated in equal sized blocks in the local memory of the ASIC 408. The first datum in each block contains the address of tile next block on the list, and the last block on the free list is indicated by a NULL value in this datum. Allocation of memory is performed by the Device Control Computer 401. The size of a block is maintained in a register in the list manager module. At the start of a compression, blocks are assigned to each stream of data by the list manager module 527 as follows:

The free list head address is copied to the root address entry in the management table 200, and also to the current block address entry. The Fill index counter is set to zero.

The address of the next block is copied from the first datum in the assigned block to the free list head address.

The first datum in the newly assigned block is set to NULL.

The active flag 210 is asserted as each stream is assigned a block from the free list.

As each buffer 526 fills, if its active flag is asserted, the list manger module 527 asserts a request to the arbiter to write its data. When the arbiter responds to a request, a write is performed as follows.

The fill index is added to the current block address for the data stream to obtain the address to write to. The data is passed to the memory arbiter and written to the address so obtained.

The fill index is incremented by the size of the written data. If the result is equal to the size of a block, then a new block is required. Note that the size of a block must be an integer multiple of the size of a data write.

If a new block is required, it is obtained from the free list as follows:

The address in the free list address register is checked, and if NULL, the free list is empty. Otherwise the address in the free list address register is written to the address in the current block address entry for the data stream, and then into the Current block address entry itself.

The address of the next block is copied from the first datum in the assigned block to the free list head address.

The first datum in the newly assigned block is set to NULL.

In the case that the entry in the free list address register was NULL, three actions are possible. The system can wait until memory is freed by the decompressor 409, and a released block becomes available on the free list, or it can start freeing data from compressed data streams in the current page, or it does not allocate a new block and the data is discarded (possibly de-asserting the active flag of the current stream) In order to free data from the current page, the system de-asserts the active flag 210 in the least significant of the currently active data streams, if this least significant stream is less significant than the stream for which a new block is requested. The linked list root address value from the memory management table entry of the data stream so freed is copied to the Free List Head register, and the Current block address is copied to the Free List Tail register. The latter register is also used by the decompressor 409 when adding memory blocks to the free list.

When an image compression completes, the final state of the memory management table is copied to the task list for the decompressor module 409. The task list is maintained by the Device Controller Computer, and tasks are passed to the decompressor module as the associated data is required by the printer engine. Note that there will be a separate such table for each channel of ink values. This allows each channel to be decompresses independently, so that decompression is only performed as the printer engine is ready to receive the data. This minimises the amount of storage required for uncompressed data.

Figure 6A:
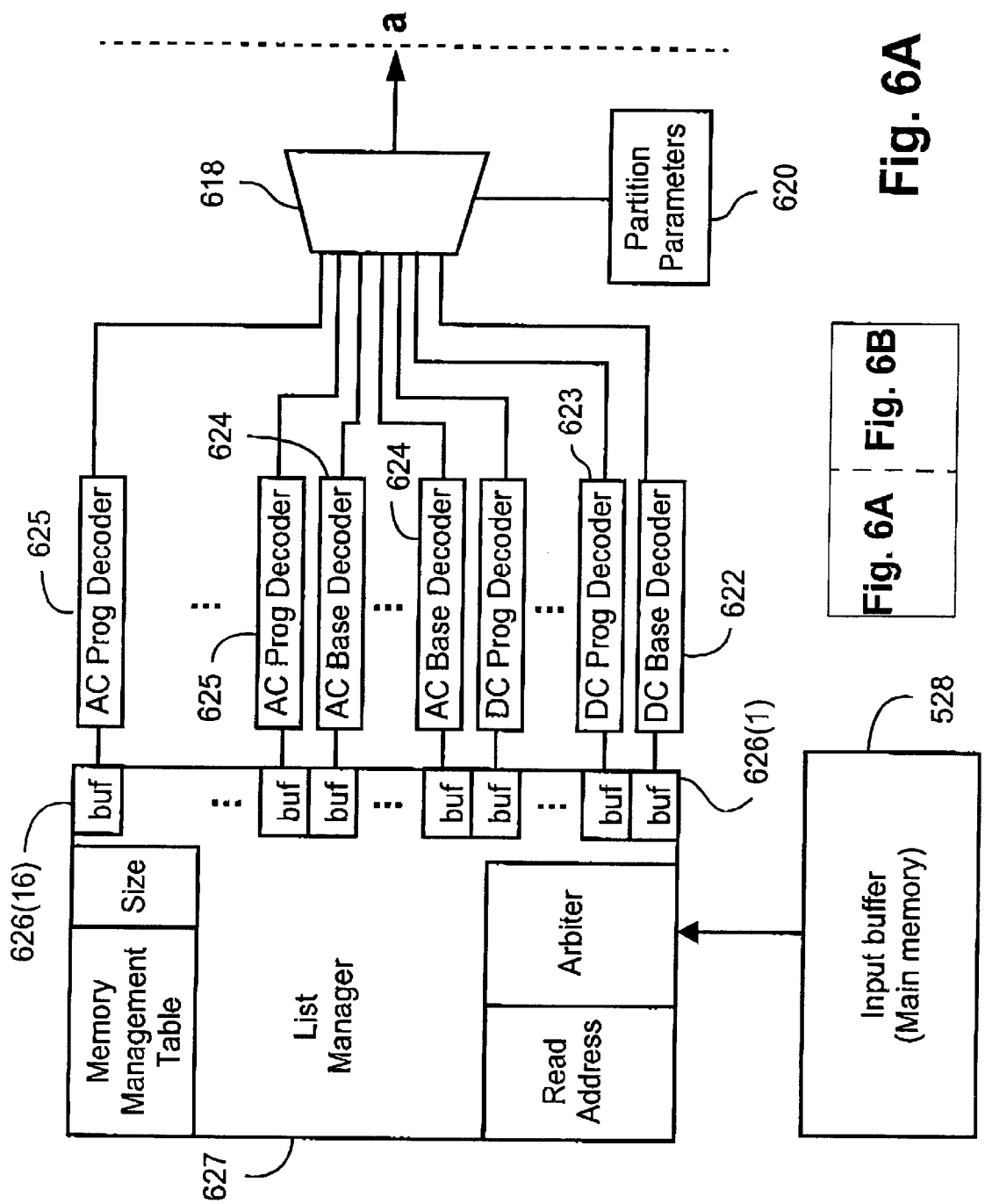
FIGS. 6A and 6B show a block diagram of the image decompression module 409 of the rendering pipeline of FIG. 4.
Figure 6B:
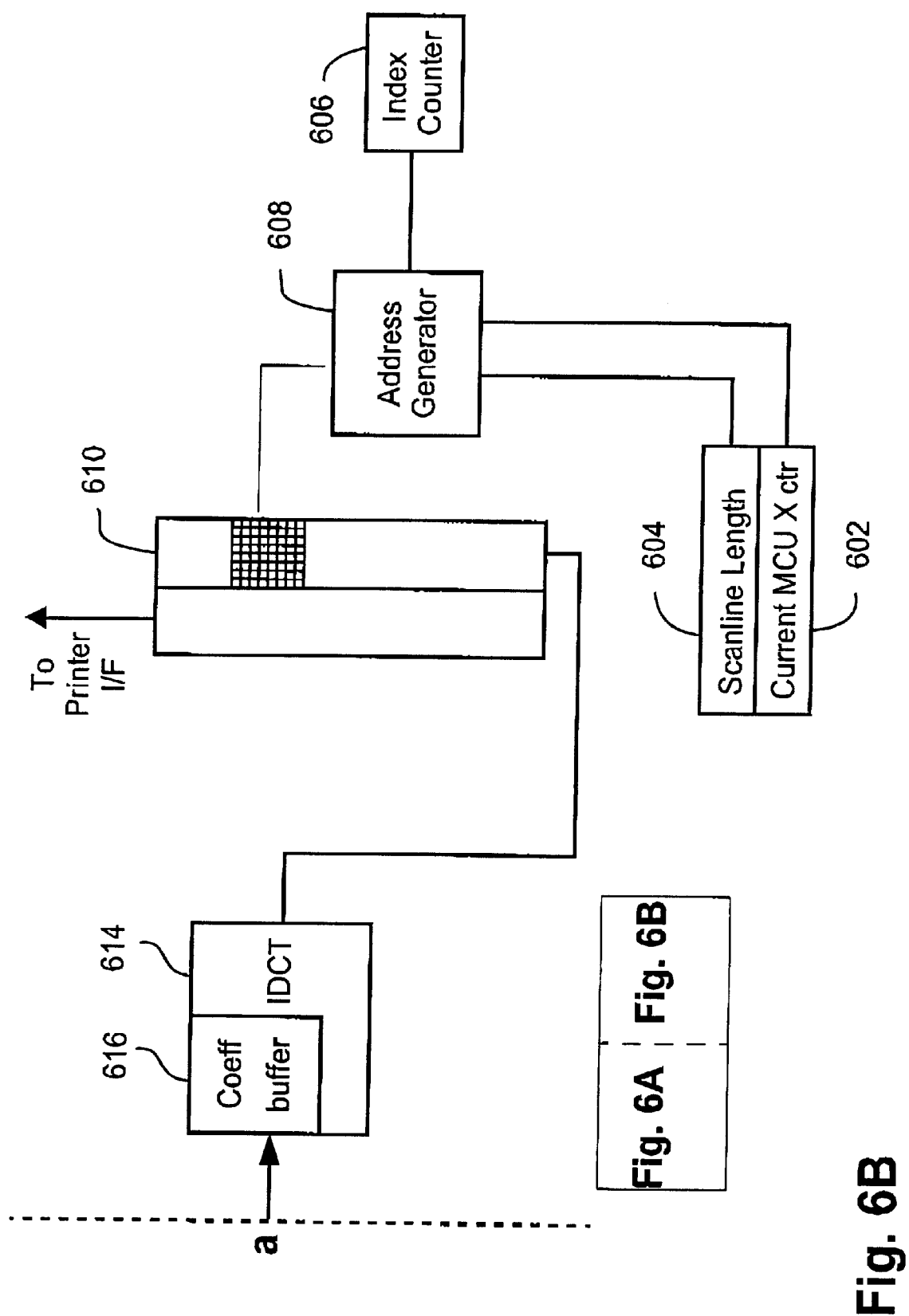

Referring now to FIGS. 6A and 6B, the decompression module 409 is the inverse of the compression process, except that decoding is only performed for those partitions which are indicated as active in the task table, these being the data streams which were active when the image compression completed, earlier. The activity of the data streams is indicated to the decoders 622, 623, 624, 625, and to the coefficient accumulators, 618, so that only the active streams contribute data to the final coefficients in the DCT.

The list manager module 627 in the decompression module 409 includes a buffer 626(1) . . . 626(16) for each data stream. Each of these is arranged as a double buffer, so that data can be fed to the decoders while other data is being fetched from memory 528. The active buffers 626(1) . . . 626(16) request data from the arbiter, and the read address is calculated by looking up the task table to obtain the address of the currently reading block of memory. Note that this will initially be the field originally copied from the linked list root address field of the memory management table used by the compressor, and that the block index is initially zero. The read address is obtained by adding the block index value to the root address field. When the data is returned, the block index is incremented by the size of a data fetch.

If the block index is equal to the size of the block, then the block has been filly read, and may be freed. To free the block, the decompressor list manager writes the address of the newly freed block to the address in the free list tail register in the list manager of the compressor, and then to free list tail register itself. If the free list head register is NULL, then this value is transferred to the free list head register by the compressor list manager. The first entry of the newly freed block is set to NULL to indicate the end of the free list. Note that block assignment by the compressor module is disabled during this process.

Figure 8:
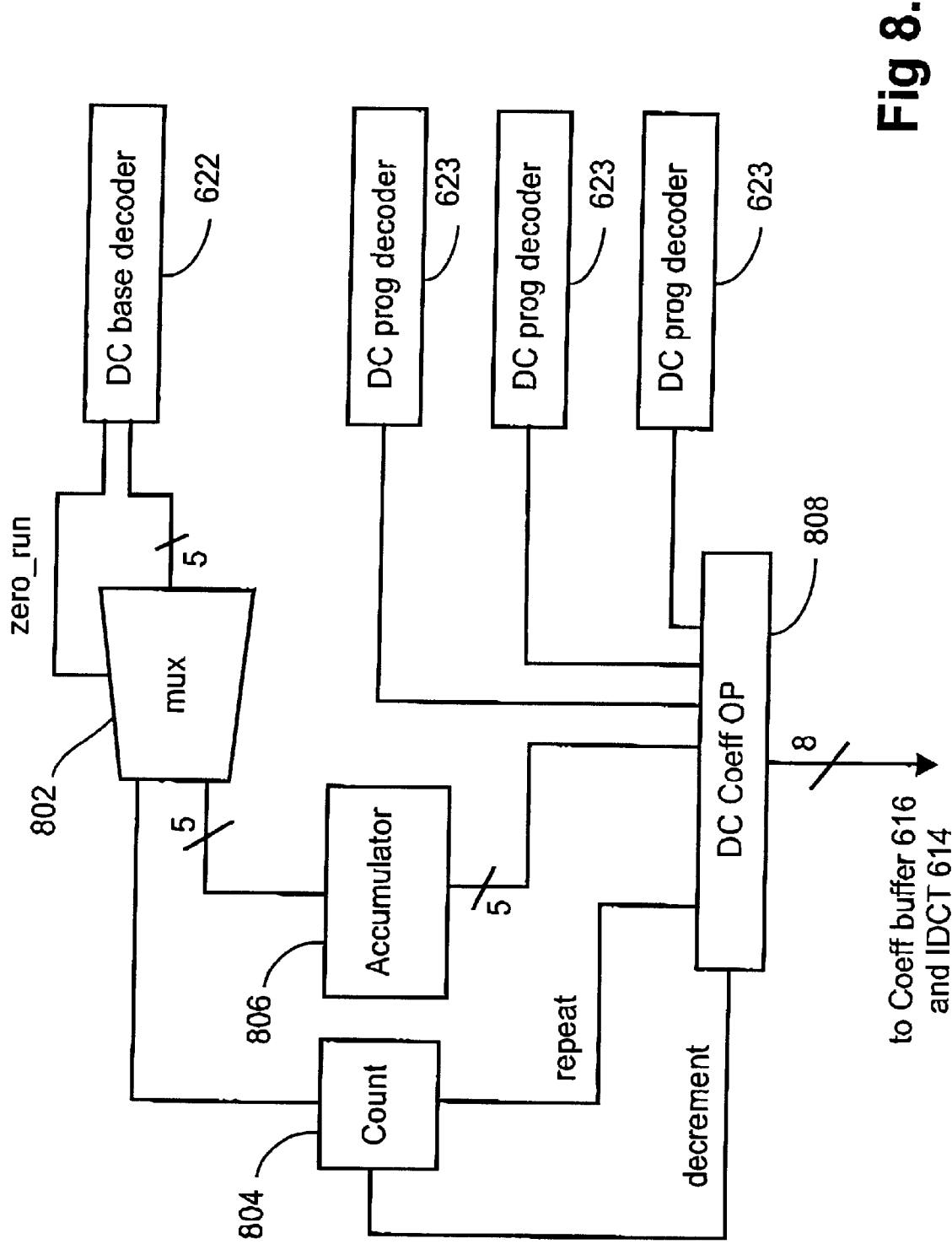
FIG. 8 shows a block diagram of that part of the decoding circuit 618 of FIGS. 6A and 6B that processes the DC coefficient.

Each active stream is decoded according to its content. Referring to FIG. 8, the decoding circuitry 618 is shown in more detail for the DC coefficient. The DC base component stream is Huffman decoded, and un-differenced. The first decoded datum in the stream is loaded into an accumulator inside the decoder. Subsequent symbols may decode either as a run of zeroes, or as a value to be added to the accumulator. If the datum is a value, the zero run signal is de-asserted so that multiplexer 802 passes it to the accumulator 806 where it is added to the accumulated value to obtain the top bits of the base coefficient and the resulting value emitted to the output interface 808. Otherwise, if the Huffman symbol decodes as a run of zeroes, the count value is loaded into the count register 804. The accumulated value in 806 is emitted to the output 808 and the count is decremented until the count reaches zero, and the next decoded value is obtained.

DC correction bits are appended to the coefficient from the active DC progressive streams. The DC correction bits are clocked out of the output 808 with the corresponding DC base value. If the stream is not active, a zero is appended.

The AC base Decoders (624) first decodes the Huffman Symbols into value and run length symbols, and then decodes the value and run length symbols into a stream of data values. There is one AC Base Decoder (624) for each base stream. In parallel the AC Progressive decoders (625) decode the Huffman Symbols into value and run length symbols for the progressive streams. The output of the AC Progressive Decoder is a string of one and zero bits, and a full value for the case where the AC Base Value was zero but the progressive value non-zero. The separate scans are combined by the scan combiner (618). The Scan Combiner is divided into two main pars the DC combiner FIG. 8 and the AC combiner FIG. 9.

Figure 9:
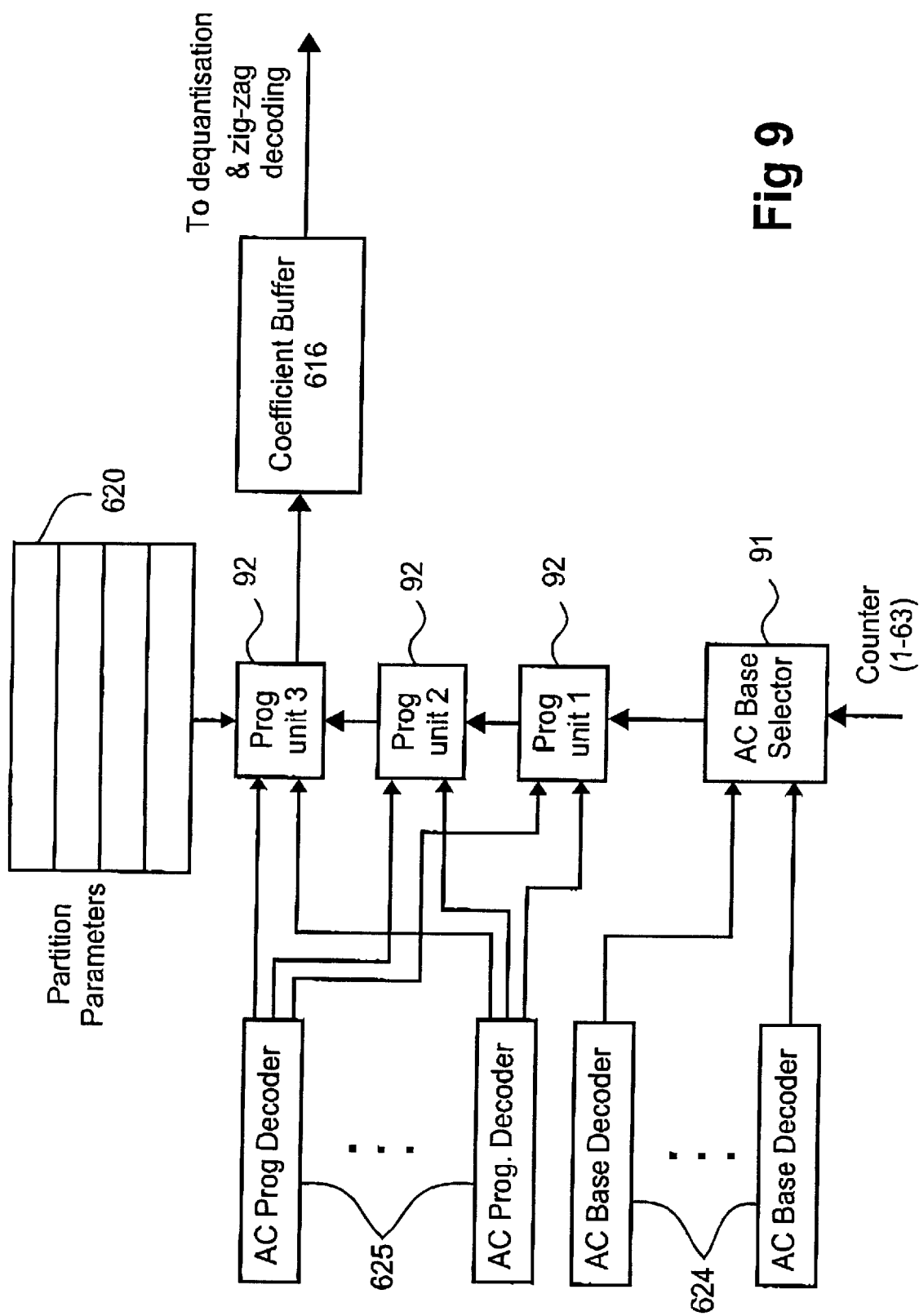
FIG. 9 shows a block diagram of that part of the decoding circuit 618 of FIGS. 6A and 6B that processes the AC coefficients.

Referring to FIG. 9, the decoding circuitry 618 is shown in more detail for the AC coefficients. The AC Combiner takes the decoded AC Base, and AC Progressive streams from the AC Base Decoders and the AC Progressive Decoders, and forms them into the 63 AC JPEG Coefficients in the coefficient buffer (616). The AC Combiner uses a pipeline to provide a continuous flow of AC coefficients into the coefficient buffer (616). The first stage of the pipeline is the AC Base Selector (91), which uses the contents of the Partition Parameters (620) to select which of the outputs of the AC Base Decoders to use for each coefficient. The value of the coefficient is then sent to the first of the AC Progressive selectors (92). The AC Progressive Selectors (92) select the correct value from the AC Progressive Decoders, and merge the value with the output of the previous AC Progressive Decoder or the AC Base Decoder.

The AC Base Selector takes the value from the AC Base Decoder and shifts the value to the correct position for output.

If the input to each AC Progressive Selector from the previous selector in the pipeline is zero, and the value from the AC Progressive Decoder is not a Zero Run Length symbol, then no bit is removed from the AC Progressive decoder, and the coefficient value of zero is passed unchanged to the next AC Progressive Selector.

If the input to the AC Progressive Selector from the previous selector in the pipeline is zero, and the value from the AC Progressive Decoder is a Zero Run Length symbol then a zero bit is output for each coefficient until the run length reached zero. The sign bit and first value bit is then output to form a +1 or −1 coefficient, which is passed to the next stage.

It the input to the AC Progressive Selector from the previous selector in the pipeline is not zero then the next bit front the AC Progressive Decoder is merged with the input coefficient and output to the next stage. The output from the final AC Progressive Selector is stored in the Coefficient Buffer 616.

In the preferred design there are three progressive AC Selection stages, this number can be reduced to reduce the cost of the ASIC, or increased to allow more flexibility.

Referring back to FIGS. 6A and 6B, once all of the coefficients have been decoded in zig-zag order into the coefficient buffer 616, the resulting coefficients are passed to the IDCT module 614, where an Inverse Discrete Cosine transform is applied to the coefficients, thereby to obtain the pixel values for the MCU.

The output of the IDCT is written to the output buffer in MCU order. This means that an entire row of MCUs must be written to memory before emission to the printer engine can begin The output buffer 610 therefore has a double buffer arrangement which allows data from one row of MCUs to be output while the next row is being written to the other buffer. The address generator 608 for writing data has a register 604 for the scanline length, and a counter 602 to keep track of which MCU is being written. The address generator uses an index counter 606 to count pixels within the MCU. The address generator disables writing for the padding at the end of a scanline. The generated address is:

$$\text{Address}=Bpp*(MCU<<3+(IX>>3)*\text{Scanline}+IX\%8),$$

where Bpp is the number of bytes per pixel, MCU is the value in the MCU counter 502, IX is the value in the index counter 506, and Scanline is the scanline length stored in the register 504.

Decompression is done color channel by color channel as needed by the printer. If the image has had one or more data streams omitted to reduce the size of the compressed image, then these streams are replaced by zeroes in the decompression. This is done after the Huffman decoding, and before the zigzag encoding. The output of the data to the printer is done as needed, to allow for connection to different printers with varying requirements for line and page length. The ASIC provides for:

Adding 0 or more blank lines to the start of the page.
Adding 0 or more blank lines to the end of the page.
Adding 0 or more blank pixels to the start of each line.
Adding 0 or more blank pixels to the end of each line.
Truncating the page to a selected number of lines.
Truncating each line to a selected number of pixels.

The above second arrangement is an ASIC designed as a pipeline processor, each data item is passed from one stage of the pipeline to the next, and each stage of the process acts on one or a small group of pixels at a time. The use of a pipeline design allows the ASIC to work in parallel on pixels with out a large amount of duplicated hardware.

A number of modules in the ASIC can be duplicated. These include the Compression, and Decompression modules, one instance for each color channel, and key parts of the Colour Space conversion hardware.

The logic for some modules can be shared between different color channels for scans.

Memory management in a printer system such as described here is complex and there are many factors to be considered. The second arrangement described herein can be configured for many different situations.

For example the second arrangement could be used for a system that tries to keep three pages in progress through the system: one page being printed, a second ready to print, and a third being compressed for printing. If memory allows more pages can be kept ready to print, this will often happen for pages that compress well. Further there are two memory limits which can be dynamically configured. The first limit is only applied when memory runs out, the second higher) limit is applied to all compressions at all times. While there is free memory the second arrangement will continue compressing each page as it is received. When there is no memory available to receive another page the second arrangement preferably does the following in order. If there is more than one page waiting to print or printing the input to the compressor will stall, and the compression stages will be idle until part or all of the currently printing page is completely printed, and memory released. If there is a page printing and no pages waiting to print, and the memory allocated to this job is over the first limit, least significant scans are released from memory enabling the compression process to continue. For high speed printers it may be desirable to have more images in the pipeline.

Huffman Coding and Decoding

It is not obvious that non-adaptive entropy coding of multiple scans is competitive with baseline JPEG (as an example benchmark), in terms of compression performance. However, experiments conducted by the inventors suggest that this is indeed the case. Thus non-adaptive JPEG type Huffman coding is used in the first and second arrangements since this offers a relatively low cost entropy coding option, particularly for encoding/decoding multiple scans, while still offering good compression performance. Further using such JPEG-type entropy coding means that the compressed image can be JPEG complaint, and or transcoded to a baseline JPEG format. For a single pass system this means that image optimised Huffman tables cannot be used. Thus, preferably fixed Huffman tables are used in the one-pass first and second arrangements. For the first scans, those encoding the first bit planes for the DCT coefficients, preferably the default Huffman tables suggested by JPEG are used. For the other scans (termed refinement scans), those that encode bit plane data only, these tables are not appropriate. Preferably the following bits and huffval vectors are used, where the bits vector is the list of code lengths and huffval is the list of Huffman symbols, as used by the JPEG canonical Huffman table specification.

```
bits = 1, 0, 2, 2, 1, 3, 4, 1, 4, 3, 1, 1, 0, 2, 0, 7
huffval =
    0x01, 0x00, 0x11, 0x21, 0x31, 0x41, 0x51, 0x61,
    0x71, 0x10, 0x81, 0x91, 0xa1, 0xb1, 0x20, 0xc1,
    0xd1, 0xf0, 0x30, 0xe1, 0xf1, 0x40, 0x50, 0x60,
    0x70, 0x80, 0x90, 0xa0, 0xb0, 0xc0, 0xd0, 0xe0
```

Note how only 32 different symbols are defined. This is because for the refinement scans there are only 32 different possible symbols to be Huffman encoded.

Huffman encoders are often implemented using lookup tables. Using fewer symbols for Huffman coding is advantageous since a smaller lookup table for encoding may be used. Further the maximum length of the Huffman code may be constrained without comprising the efficiency of the Huffman code as significantly as if more symbols were used. Using constrained length Huffman codes is advantageous because it allows for smaller lookup tables to be used for decoding.

In an alternate arrangement a separate Huffman code is used for each band of frequencies. Further, preferably for scans that have a maximum (intra-block) zero run-length that is less than 16, fewer symbols are used. For example, for scans encoding AC coefficients 1–5, the longest (intra-block) zero run is 4. By also reducing the number of EOB run codes used in the encoding process to 5, preferably a Huffman code for 10 symbols only is used for these scans. In this way, a Huffman code using a reduced set of symbols is employed, preferably based on the frequencies in the scan partition and also based on the number of bitplanes in the bit plane partition. Preferably the Huffman codes are also constrained to be limited to 8 bits in length at most. Thus relatively small Huffman decoding tables are preferably employed. Using simpler Huffman coding and decoding is particularly advantageous when used with multiple Huffman coders and decoders as described below.

In another alternate arrangement, Huffman codes can be updated after some number of MCUs, such as an MCU row, or multiples thereof. Each new Huffman code table needs to be put in the bit stream so that the decoder can use the new code as appropriate. The disadvantage of such an approach is that compliance with JPEG is lost. However, the ability remains to transcode to baseline JPEG, for example.

Preferably the entropy coding and decoding operates in real time. That is the images are compressed and decompressed with a predicable throughput. Further, preferably the compression and decompression operate preferably at one image (byte) pixel or greater per clock cycle. In order to achieve such a throughput preferably the scan encoders and decoders operate substantially in parallel. That is, preferably there is a separate Huffman coding circuit and decoding circuit for each scale (alternatively there may be one for the DC band, and one for each AC bit plane, which is shared with each AC scan in the same bit plane). Each scan is then coded or decoded with its own circuit at substantially the same time as other scans. In this way if each Huffman coder and decoder operates at one pixel per clock cycle or faster, then the overall throughput is at least one pixel per cycle.

For the decoding of scans, decoding lower order bit planes require information from the same spatial location at higher order bit planes. This implies a causality restriction. This causality restriction is preferably handled by having a pipeline of decompression blocks. For the alternative preferred arrangement with a partition of four (sets of) bit planes there preferably 4 DCT blocks used in the scan decoding pipeline (further blocks are used for the inverse DCT). In the first block of the scan decoding pipeline the first bit plane data is decoded. In the second block, which decompresses data one block behind the first block, the second bit plane data is decoded, and so on. In this way each scan decoder has access to any bit plane data that is necessary for decoding, and, ignoring the pipleline startup delay, the decoding can essentially operate in parallel, with a high throughput.

The simple form of Huffman entropy (including the statistical model) coding and decoding used in JPEG is advantageous for systems that require a several entropy coders, such as the present arrangements. This simple form allows for a small hardware circuit, that is not prohibitively large when duplicated for each Huffman coder/decoder. Further for software or sequential applications, this simple form means fast encoding/decoding.

Adaptive coding, such as arithmetic coding, as described above, could be used with the preferred arrangements. However fixed Huffman coding allows simpler encoding and decoding, which is advantageous, particularly using multiple entropy coders or decoders.

Special Image Types

In CMYK printing data the K channel is typically used to represent black and white and greyscale text data For black and white text images the K channel data has values typically either 0 or 255, while typically the C, M and Y channels have 0 values only. Such K channel images are henceforth referred to as black and white K channel images. JPEG is essentially a lossy compression method, and as such the fixed output compression arrangements thus described are lossy (except possibly the variation using a lossless DCT). However, a form of lossless decoding can be employed on black and white K channel images. The loss introduced by JPEG (or other) compression system can be quantified in various ways. For example the maximum error (sometimes referred to as the 1-infinity error) is the maximum possible error between the decompressed image and the original image. For a fixed quantization table a bound on the maximum error can be calculated. The largest possible error in the decompressed image, due to quantization, is bound by 6.9794 times the largest quantization error for the DCT employed by JPEG. In practice the largest error in the decompressed image can be significantly less than this 6.9794 times bound.

For practical implementations of JPEG the quantization is not the only part of the system that introduces loss, but it by far the most significant part. The loss introduced by approximate implementations of the DCT can also be quantified in a similar manner if required, but are not significant for the quantization strategies described in the above arrangements, and are hence ignored. For the quantization described in the first arrangement each DCT coefficient is quantized with a step size of 4. This introduces a maximum possible error, in the DCT domain, of 2, and thus the maximum decompressed error is (6.9794*2=)13.9587, or 14 after rounding to the nearest integer. If one bit plane is deleted (via a scan being discarded) the maximum error in the DCT domain is 8, giving a maximum decompressed error of 55.8348. Similarly if two bit-planes are deleted the maximum error is 111.6696. In all the quantization cases just described the maximum error is less than 127.

In an alternative arrangement, the compressor, attaches some meta-data, preferably in a JPEG application specific marker (APPn) that indicates whether of not the K channel is in fact a black and white K channel image. This is preferably done after the single compression pass of the image, since the compressor generally cannot know this in advance in such a pipelined system. Then preferably the decompressor utilises this meta-data by decoding as follows. If the K channel is a black and white K channel image, and the quantization is such that the largest possible error is less than 127, then decompressesd data values that are greater than 128 are truncated to 255, and decompressed data values that are less than 128 are truncated to 0.

If the largest possible decompressed error is less than 127, and an original data value was 255, then the corresponding decompressed value will be greater than 128, and hence decompressed finally, losslessly as 255. Similarly, for an original value of 0, and a maximum error of less than 127, the decompressed value will be less than 128, and hence decompressed finally, losslessly as 0. In this way K channel is guaranteed to be decompressed losslessly. Should the decompressor ascertain that the maximum possible error is greater than 128, or the image is not a black and white K channel image then no truncation occurs.

This type of truncation can be extended from binary type data (for example black and white K channels) to data having a limited but larger number of possible values (for example 4 or 8 different possible values). As long as the decompressor can ascertain the maximum possible error is less than the mid-point between a pair of values, truncation can produce a lossless reconstruction.

For a given level of quantization, some images compress less than others. When designing a system with a fixed amount of compressed image memory, the most difficult images to compress often dictate the size of the compressed image memory required to satisfy the design constraints (such as reasonable decompressed image quality for substantially all images encountered in practice). Reducing the compressed size of such difficult images for a given level of quantization has a greater impact on the compressed image memory requirements than reducing the average compressed size across all images (or typical images). Thus, in an alternate arrangement the Huffman codes are optimised for a class of images representative of images that are difficult to compress, resulting in better compression for such images, possibly at the expense of the overall average compression, but nonetheless reducing the amount of memory required for the system.

The aforementioned preferred method(s) comprise a particular control flow. There are many other variants of the preferred method(s) which use different control flows without departing the spirit or scope of the invention.

Industrial Applicability

It is apparent from the above that the arrangements described are applicable to the computer graphics and printing industries and other related industries.

The foregoing describes only some embodiments of the present invention, and modifications and/or changes can be made thereto without departing from the scope and spirit of the invention, the embodiment(s) being illustrative and not restrictive.

We claim:

1. A method of storing coded image data of an image in a storage of fixed memory size, wherein the image comprises a plurality of pixels and the method comprises the steps of:

arranging the image into a plurality of bands each comprising a predetermined number N of consecutive lines of pixels; and buffering and processing the bands one by one in turn, wherein said processing step comprises the following sub-steps for each currently buffered band:
arranging the current band into a plurality of blocks of pixels of size M×M, wherein M is equal to the predetermined number N;
transforming the blocks of pixels to produce respective blocks of transform coefficients;
partitioning the blocks of transform coefficients into a plurality of partitions wherein each partition comprises data from each block of transform coefficients and at least one partition comprises data from at least one but not all bit planes of each block of transform coefficients, and wherein the plurality of partitions comprise a perceptually significant partition and a perceptually insignificant partition and partitions of varying perceptually significance there between;
coding each partition; and
managing the storing of the coded partitions in the storage of fixed memory size, wherein during the storing of the coded partitions if it is determined the storage is full, a coded least perceptually significant partition currently stored in the buffer is overwritten by data from a coded more perceptually significant partition.

2. The method as claimed in claim 1, wherein one partition comprises bit symbol data from least significant bit-planes of the blocks of transform coefficients.

3. The method as claimed in claim 2, wherein another partition comprises bit symbol data from the next highest bit-planes above the least significant bit-planes of the blocks of transform coefficients.

4. The method as claimed in claim 3, wherein another partition comprises bit symbol data from a plurality of bit-planes above the next highest bit-planes of the blocks of transform coefficients.

5. The method as claimed in claim 1, wherein the blocks of transform coefficients are partitioned in accordance with the following scan table, where component 0 is the Y component, component 1 is the Cb component, and component 2 is the Cr component, Ss and Se specify the start and end index of the transform coefficients, and the Ah:Al pair specifies the bit precision high and low parameters respectively:

| Scan Table | | |
|---|---|---|
| Components | Ss-Se | Ah:Al |
| 0, 1, 2 | 0–0 | 0, 2 |
| 0 | 1–63 | 0, 2 |
| 2 | 1–63 | 0, 2 |
| 1 | 1–63 | 0, 2 |
| 0, 1, 2 | 0–0 | 2, 1 |
| 0 | 1–5 | 2, 1 |
| 2 | 1–5 | 2, 1 |
| 1 | 1–5 | 2, 1 |
| 0 | 6–63 | 2, 1 |
| 2 | 6–63 | 2, 1 |
| 1 | 6–63 | 2, 1 |
| 0, 1, 2 | 0–0 | 1, 0 |
| 0 | 1–5 | 1, 0 |
| 2 | 1–5 | 1, 0 |
| 1 | 1–5 | 1, 0 |
| 0 | 6–63 | 1, 0 |
| 2 | 6–63 | 1, 0 |
| 1 | 6–63 | 1, 0 |

6. The method as claimed in claim 1, wherein N and M are both equal to eight.

7. The method as claimed in claim 1, wherein said step of coding comprises Huffman entropy coding each partition.

8. The method as claimed in claim 1, wherein said step of coding comprises reduced set Huffman entropy coding each partition with length limited Huffman codes.

9. The method as claimed in claim 1, wherein said step of coding comprises entropy coding each partition with a progressive Huffman coding technique.

10. The method as claimed in claim 1, wherein the image comprises pixels having C, M, Y, and K channels and said method further comprises the steps of:
attaching meta-data to the stored coded partitions to indicate whether or not the K channel is a black and white K channel image.

11. The method as claimed in claim 1, wherein said step of coding comprises entropy coding each partition with Huffman codes that are optimized for a class of images representative of images that are difficult to compress.

12. A method of storing coded image data of an image in a storage of fixed memory size, wherein the image comprises a plurality of pixels and the method comprises the steps of:
arranging the image into a plurality of bands each comprising a predetermined number N of consecutive lines of pixels; and
buffering and processing the bands one by one in turn, wherein said processing step comprises the following sub-steps for each currently buffered band:
arranging the current band into a plurality of blocks of pixels of size M×M, wherein M is equal to the predetermined number N;
transforming the blocks of pixels to produce respective blocks of transform coefficients;
partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptual significance there between;
coding each partition; and
managing the storing of the coded partitions in the storage of fixed memory size, wherein during the storing of the coded partitions if it is determined the storage is full, a coded least perceptually significant partition currently stored in the buffer is overwritten by data from a coded more perceptually significant partition, and wherein the managing step comprises the sub-steps of:
assigning in the storage corresponding linked lists for the coded partitions; and
determining during the storage of the coded partitions if the storage is full and if so, freeing a linked list of a coded least perceptually significant partition currently stored in the buffer allowing it to be overwritten by data from a coded more perceptually significant partition.

13. The method as claimed in claim 12, wherein at least one partition comprises bit-plane data from each block of transform coefficients.

14. The method as claimed in claim 12, wherein said determining sub-step determines whether the storage is full by checking whether there are any free blocks in storage available for allocation to a coded partition.

15. The method as claimed in claim 12, wherein said managing step comprises the sub-step of:
maintaining a memory management table on the current status of the linked lists for the coded partitions.

16. The method as claimed in claim 15, wherein the memory management table comprises a flag for each partition and the managing step comprises the sub-steps of:
initializing the flags as active; and
setting the flag in the memory management table indicating that a freed linked list of the coded least perceptually significant partition is inactive.

17. The method as claimed in claim 16, wherein said managing step comprises the sub-steps of:
receiving a signal indicating that data of an entropy coded partition is available for storing in the storage; and
checking whether the flag of the memory management table corresponding to the available data of the entropy coded partition is active and if not returning to an idle state.

18. The method as claimed in claim 16, wherein said managing step comprises the sub-steps of:
receiving a signal indicating data of an entropy coded partition is available for storing in the storage;
checking whether the flag of the memory management table corresponding to the available data of the entropy coded partition is active and if so, checking whether there are any free blocks in storage available for allocation to the available data of the entropy coded partition and if not setting the corresponding flag of the memory management table to inactive.

19. The method as claimed in claim 12, wherein said managing step comprises the sub-step of:
storing, in the storage, information concerning the linked lists of the entropy coded partitions.

20. A method of decoding an image, comprising the steps of:
buffering respective coded data of bands of the image one by one in turn in a storage of fixed memory size;
processing the respective coded data of the bands of the image, wherein said processing step comprises the following sub-steps for each currently buffered band:
retrieving information from the storage on at least one linked list stored in the storage corresponding to at least one coded partition;

retrieving from the storage said at least one partition utilizing the information;

decoding the retrieved at least one partition;

reconstituting blocks of transform coefficients of size M×M from the at least one decoded partition, wherein each decoded partition comprises data from blocks of transform coefficients, and wherein the at least one partition comprise a perceptually significant partition;

inverse transforming the blocks of transform coefficients to produce respective blocks of pixels; and reconstituting the current band of the image from the blocks of pixels, wherein the band comprises a predetermined number N of lines of pixels and M is equal to the predetermined number N.

21. The method as claimed in claim 20, wherein the at least one partition comprises bit-plane data from each block of transform coefficients.

22. The method as claimed in claim 20, wherein the image comprises pixels having C, M, Y, and K channels and the coded data comprises meta-data indicating whether or not the K channel is a black and white K channel image, and said method further comprises the step of:

truncating the transform coefficients, in the event the K channel is a black and white image, to one of two predetermined values.

23. Apparatus for storing coded image data of an image in a storage of fixed memory size, wherein the image comprises a plurality of pixels and the apparatus comprises:

a module adapted to arrange the image into a plurality of bands each comprising a predetermined number N of consecutive lines of pixels;

a buffer, adapted to buffer the bands one by one in turn; and a processor, adapted to process a currently buffered band, wherein the processor comprises:

a module adapted to arrange the currently buffered band into a plurality of blocks of pixels of size M×M, wherein M is equal to the predetermined number N;

a transform module, adapted to transform the blocks of pixels to produce respective blocks of transform coefficients;

a partitioning module, adapted to partition the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptually significance there between;

a coder module, adapted to code each partition; and a manager module, adapted to manage the storing of the coded partitions in the storage of fixed memory size, wherein during the storing of the coded partitions if it is determined the storage is full, a coded least perceptually significant partition currently stored in the buffer is overwritten by data from a coded more perceptually significant partition.

24. The apparatus as claimed in claim 23, wherein one partition comprises bit symbol data from least significant bit-planes of the blocks of transform coefficients.

25. The apparatus as claimed in claim 24, wherein another partition comprises bit symbol data from the next highest bit-planes above the least significant bit-planes of the blocks of transform coefficients.

26. The apparatus as claimed in claim 25, wherein another partition comprises bit symbol data from a plurality of bit-planes above the next highest bit-planes of the blocks of transform coefficients.

27. The apparatus as claimed in claim 23, wherein the blocks of transform coefficients are partitioned in accordance with the following scan table, where component 0 is the Y component, component 1 is the Cb component, and component 2 is the Cr component, Ss and Se specify the start and end index of the transform coefficients, and the Ah:Al pair specifies the bit precision high and low parameters respectively:

| Scan Table | | |
|---|---|---|
| Components | Ss-Sc | Ah:Al |
| 0, 1, 2 | 0–0 | 0, 2 |
| 0 | 1–63 | 0, 2 |
| 2 | 1–63 | 0, 2 |
| 1 | 1–63 | 0, 2 |
| 0, 1, 2 | 0–0 | 2, 1 |
| 0 | 1–5 | 2, 1 |
| 2 | 1–5 | 2, 1 |
| 1 | 1–5 | 2, 1 |
| 0 | 6–63 | 2, 1 |
| 2 | 6–63 | 2, 1 |
| 1 | 6–63 | 2, 1 |
| 0, 1, 2 | 0–0 | 1, 0 |
| 0 | 1–5 | 1, 0 |
| 2 | 1–5 | 1, 0 |
| 1 | 1–5 | 1, 0 |
| 0 | 6–63 | 1, 0 |
| 2 | 6–63 | 1, 0 |
| 1 | 6–63 | 1, 0 |

28. The apparatus as claimed in claim 23, wherein N and M are both equal to eight.

29. The apparatus as claimed in claim 23, wherein the coding module comprises a module for Huffman entropy coding each partition.

30. The apparatus as claimed in claim 23, wherein the coding module comprises a module for reduced set Huffman entropy coding each partition with length limited Huffman codes.

31. The apparatus as claimed in claim 23, wherein the coding module comprises a module for entropy coding each partition with a progressive Huffman coding technique.

32. The apparatus as claimed in claim 23, wherein the image comprises pixels having C, M, Y, and K channels and the apparatus further comprises:

a module for attaching meta-data to the stored coded partitions to indicate whether or not the K channel is a black and white K channel image.

33. The apparatus as claimed in claim 23, wherein the coding module comprises a module for entropy coding each partition with Huffman codes that are optimized for a class of images representative of images that are difficult to compress.

34. The apparatus as claimed in claim 23, wherein the buffer, for buffering the bands, is an 8-line on chip double buffer.

35. The apparatus as claimed in claim 23, wherein said image comprises CMYK color channel data, and each channel is compressed independently of other channels.

36. The apparatus as claimed in claim 23, wherein the coding module comprises a module for Huffman entropy coding wherein the Huffman code comprises a reduced symbols set based on the frequencies in the scan partition.

37. Apparatus for storing coded image data of an image in storage of fixed memory size, wherein the image comprises a plurality of pixels and the apparatus comprises:
- a module adapted to arrange the image into a plurality of bands each comprising a predetermined number N of consecutive lines of pixels;
- a buffer, adapted to buffer the bands one by one in turn; and
- a processor, adapted to process a currently buffered band, wherein the processor comprises:
- a module adapted to arrange the currently buffered band into a plurality of blocks of pixels of size M×M, wherein M is equal to the predetermined number N;
- a transform module, adapted to transform the blocks of pixels to produce respective blocks of transform coefficients;
- a partitioning module, adapted to partition the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptually significance there between;
- a coder module, adapted to code each partition; and
- a manager module, adapted to mange the storing of the coded partitions in the storage of fixed memory size, wherein during the storing of the coded partitions if it is determined the storage is full, a coded least perceptually significant partition currently stored in said buffer is overwritten by data from a coded more perceptually significant partition, and wherein the manager module comprises:
  - a module, adapted to assign in the storage corresponding linked lists for the coded partitions; and
  - a module, adapted to determine during the storage of the coded partitions if the storage is full and if so, freeing a linked list of a coded least perceptually significant partition currently stored in the buffer allowing it to be overwritten by data from a coded more perceptually significant partition.

38. The apparatus as claimed in claim 37, wherein at least one partition comprises bit-plane data from each block of transform coefficients.

39. The apparatus as claimed in claim 37, wherein the determining module determines whether the storage is full by checking whether there are any free blocks in storage available for allocation to a coded partition.

40. The apparatus as claimed in claim 37, wherein the manager module comprises:
- a module, adapted to mainain a memory management table on the current status of the linked lists for the coded partitions.

41. The apparatus as claimed in claim 40, wherein the memory management table comprises a flag for each partition and the manager module comprises:
- a module, adapted to initialize the flags as active; and
- a module, adapted to set the flag in the memory management table indicating that a freed linked list of the coded least perceptually significant partition is inactive.

42. The apparatus as claimed in claim 41, wherein the manager module comprises:
- a module adapted to receive a signal indicating data of an entropy coded partition is available for storing in the storage; and
- a module adapted to check whether the flag of the memory management table corresponding to the available data of the entropy coded partition is active and if not returning to an idle state.

43. The apparatus as claimed in claim 41, wherein, the manager module comprises:
- a module adapted to receive a signal indicating that data of an entropy coded partition is available for storing in the storage;
- a module adapted to check whether the flag of the memory management table corresponding to the available data of the entropy coded partition is active and if so, checking whether there are any free blocks in storage available for allocation to the available data of the entropy coded partition and if not setting the corresponding flag of the memory management table to inactive.

44. The apparatus as claimed in claim 37, wherein the manager module comprises:
- a module adapted to store, in the storage, information concerning the linked lists of the entropy coded partitions.

45. Apparatus for decoding an image, wherein the apparatus comprises:
- a module adapted to buffer respective coded data of bands of the image one by one in turn in a storage of fixed memory size; and
- a processor, adapted to process a currently buffered band of coded data, wherein the processor comprises:
  - a module adapted to retrieve information from the storage on at least one linked list stored in the storage corresponding to at least one coded partition of the currently buffered band of coded data;
  - a module adapted to retrieve from the storage the at least one partition utilizing the information;
  - a decoding module, adapted to decode the retrieved at least one partition;
  - a module adapted to reconstitute blocks of transform coefficients of size M×M from the at least one decoded partition, wherein each decoded partition comprises data from blocks of transform coefficients, and wherein the at least one partition comprise a perceptually significant partition;
  - an inverse transform module, adapted to inverse transform the blocks of transform coefficients to produce respective blocks of pixels; and
  - a module adapted to reconstitute the current band of the image from the blocks of pixels, wherein the band comprises a predetermined number N of lines of pixels and M is equal to the predetermined number N.

46. The apparatus as claimed in claim 45, wherein the at least one partition comprises bit-plane data from each block of transform coefficients.

47. The apparatus as claimed in claim 45, wherein the image comprises pixels having C, M, Y, and K channels and the coded data comprises meta-data indicating whether or not the K channel is a black and white K channel image, and the apparatus further comprises:
- a module adapted to truncate the transform coefficients, in the event the K channel is a black and white image, to one of two predetermined values.

48. A computer program for storing coded image data of an image in a storage of fixed memory size, wherein the image comprises a plurality of pixels and the computer program comprises:

means for arranging the image into a plurality of bands each comprising a predetermined number N of consecutive lines of pixels; and means for buffering and processing the bands one by one in turn, wherein the processing means performs the following steps for each currently buffered band:

arranging the current band into a plurality of blocks of pixels of size M×M, wherein M is equal to the predetermined number N;

transforming the blocks of pixels to produce respective blocks of transform coefficients;

partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptually significance there between;

coding each partition; and managing the storing of the coded partitions in the storage of fixed memory size, wherein during the storing of the coded partitions if it is determined the storage is full, a coded least perceptually significant partition currently stored in the buffer is overwritten by data from a coded more perceptually significant partition.

49. A computer program for storing coded image data of an image in a storage of fixed memory size, wherein the image comprises a plurality of pixels and the computer program comprises:

means for arranging the image into a plurality of bands each comprising a predetermined number N of consecutive lines of pixels; and means for buffering and processing the bands one by one in turn, wherein the processing means performs the following steps for each currently buffered band:

arranging the current band into a plurality of blocks of pixels of size M×M, wherein M is equal to the predetermined number N;

transforming the blocks of pixels to produce respective blocks of transform coefficients;

partitioning the blocks of transform coefficients into a plurality of partitions wherein each partition comprises data from each block of transform coefficients and at least one partition comprises data from at least one but not all bit-planes of each block of transform coefficients, and wherein the plurality of partitions comprise a perceptually significant partition and a perceptually insignificant partition and partitions of varying perceptually significance there between;

coding each partition; and managing the storing of the coded partitions in the storage of fixed memory size, wherein during the storing of the coded partitions if it is determined the storage is full a coded least perceptually significant partition currently stored in the buffer is overwritten by data from a coded more perceptually significant partition, and wherein the managing step comprises the sub-steps of:

assigning in the storage corresponding linked lists for the coded partitions; and determining during the storage of the coded partitions if the storage is full, and if so freeing a linked list of a coded least perceptually significant partition currently stored in the buffer allowing it to be overwritten by data from a coded more perceptually significant partition.

50. A computer program, for decoding an image, wherein the computer program comprises:

means for buffering respective coded data of bands of the image one by one in turn in storage of fixed memory size; and means for processing the respective coded data of the bands of the image, wherein the processing means performs the following steps for each currently buffered band:

retrieving information from the storage on at least one linked list stored in the storage corresponding to at least one coded partition;

retrieving from the storage the at least one partition utilizing the information;

decoding the retrieved at least one partition;

reconstituting blocks of transform coefficients of size M×M from the at least one decoded partition, wherein each decoded partition comprises data from blocks of transform coefficients, and wherein the at least one partition comprises a perceptually significant partition;

inverse transforming the blocks of transform coefficients to produce respective blocks of pixels; and reconstituting the current band of the image from the blocks of pixels, wherein the band comprises a predetermined number N of lines of pixels and said M is equal to the predetermined number N.

* * * * *

UNITED STATES PATENT AND TRADEMARK OFFICE
CERTIFICATE OF CORRECTION

PATENT NO. : 6,664,902 B2
APPLICATION NO. : 10/003101
DATED : December 16, 2003
INVENTOR(S) : James Philip Andrew et al.

It is certified that error appears in the above-identified patent and that said Letters Patent is hereby corrected as shown below:

On the Title Page, Item -54-

"CODING" should read --CODED--.

COLUMN 1

Line 1, "CODING" should read --CODED--; and
Line 21, "images" should read --image--.

COLUMN 2

Line 37, "ate" should read --are--; and
Line 43, "That is" should read --That is,--.

COLUMN 3

Line 16, "perceptually significance there between;" should read --perceptual significance there between;--;
Line 43, "perceptually significance there between;" should read --perceptual significance there between;--; and
Line 57, "a" should be deleted.

COLUMN 4

Line 5, "comprise" should read --comprises--;
Line 12, "a" should be deleted--;
Line 33, "perceptually significance there between;" should read --perceptual significance there between;--;
Line 41, "a" should be deleted; and
Line 62, "perceptually significance there between;" should read --perceptual significance there between;--.

UNITED STATES PATENT AND TRADEMARK OFFICE
CERTIFICATE OF CORRECTION

PATENT NO. : 6,664,902 B2
APPLICATION NO. : 10/003101
DATED : December 16, 2003
INVENTOR(S) : James Philip Andrew et al.

It is certified that error appears in the above-identified patent and that said Letters Patent is hereby corrected as shown below:

COLUMN 5

Line 5, "fill" should read --full--;
    Line 9, "a" should be deleted;
    Line 25, "comprise" should read --comprises--;
    Line 54, "perceptually" should read --perceptual--; and
    Line 62, "a" should be deleted.

COLUMN 6

Line 3, "the comprises" should be deleted; and
    Line 15, "ceptually significance there between;" should read --ceptual significance there between;--;
    Line 25, "fill" should read --full--;
    Line 29, "a" should be deleted; and
    Line 45, "comprise" should read --comprises--.

COLUMN 7

Line 35, "thereof the" should read --thereof. The--; and
    Line 45, "one" should read --one of--.

COLUMN 8

Line 62, "That is" should read --That is,--.

COLUMN 9

Line 36, "bitstreams" should read --bitstream scans;--; and "such each" should read --each such--;
    Line 45, "coders" should read --encoders--;
    Line 46, "coder" should read --encoder--;
    Line 47, "order" should read --encoder--; and
    Line 64, "scans" should read --scans:--.

COLUMN 13

Line 48, "That is" should read --That is,--; and
    Line 67, "That is" should read --That is,--.

UNITED STATES PATENT AND TRADEMARK OFFICE
CERTIFICATE OF CORRECTION

PATENT NO. : 6,664,902 B2
APPLICATION NO. : 10/003101
DATED : December 16, 2003
INVENTOR(S) : James Philip Andrew et al.

It is certified that error appears in the above-identified patent and that said Letters Patent is hereby corrected as shown below:

COLUMN 14

Line 6, "That is" should read --That is,--;
Line 12, "maximise" should read --maximize--;
Line 20, "maximise" should read --maximize--;
Line 21, "and that" should read --and--;
Line 30, "set" should read --set of--;
Line 57, "JPEG2000." should read --JPEG2000).--; and
Line 60, "contribute" should read --contributes--.

COLUMN 15

Line 1, "That is" should read --That is,--;
Line 25, "on" should read --transformation on--;
Line 32, "encoder" should read --encoder,--;
Line 40, "able" should read --able to--;
Line 43, "perceptual" should read --perceptually--;
Line 51, "form of," should read --form,--;
Line 52, "modification" should read --modification,--;
Line 61, "and" should read --and by also providing--; and
Line 62, "buffering" should read --buffering,--.

COLUMN 16

Line 27, "corresponding" should read --correspond--;
Line 28, "forming" should read --form--; and
Line 30, "being" should read --are that--.

COLUMN 17

Line 28, "have" should read --has--.

COLUMN 18

Line 49, "517." should read --517).--.

UNITED STATES PATENT AND TRADEMARK OFFICE
CERTIFICATE OF CORRECTION

| | |
|---|---|
| PATENT NO. | : 6,664,902 B2 |
| APPLICATION NO. | : 10/003101 |
| DATED | : December 16, 2003 |
| INVENTOR(S) | : James Philip Andrew et al. |

It is certified that error appears in the above-identified patent and that said Letters Patent is hereby corrected as shown below:

COLUMN 19

Line 54, "In" should read --¶ In--.

COLUMN 20

Line 10, "decompresses" should read --decompressed--;
Line 19, "pression" should read --pression was--; and
Line 39, "filly" should read --fully--.

COLUMN 21

Line 14, "pars" should read --parts--; and
Line 45, "reached" should read --reaches--.

COLUMN 22

Line 32, "with out" should read --without--;
Line 45, "allows" should read --allows,--; and
Line 46, "this" should read --and this--.

COLUMN 23

Line 8, "complaint," should read --compliant,--.

COLUMN 24

Line 7, "scale" should read --scan--;
Line 15, "require" should read --requires--;
Line 19, "there" should read --there are--;
Line 45, "data" should read --data.--; and
Line 67, "it" should read --it is--.

UNITED STATES PATENT AND TRADEMARK OFFICE
CERTIFICATE OF CORRECTION

| | | |
|---|---|---|
| PATENT NO. | : 6,664,902 B2 | |
| APPLICATION NO. | : 10/003101 | |
| DATED | : December 16, 2003 | |
| INVENTOR(S) | : James Philip Andrew et al. | |

It is certified that error appears in the above-identified patent and that said Letters Patent is hereby corrected as shown below:

COLUMN 26

Line 20, "predetennined" should read --predetermined--;
    Line 39, "perceptually significance there between;" should read --perceptual significance there between;--.

COLUMN 27

Line 66, "perceptually significance there between;" should read --perceptual significance therebetween;--.

COLUMN 29

Line 8, "comprise" should read --comprises; and
    Line 52, "ceptually significance there between" should read --ceptual significance there between;--.

COLUMN 31

Line 24, "perceptually" should read --perceptual--;
    Line 28, "mange" should read --manage--; and
    Line 53, "mainain" should read --maintain--.

COLUMN 32

Line 43, "comprise" should read --comprises--.

COLUMN 33

Line 20, "perceptually significance there between;" should read --perceptual significance there between;--.

UNITED STATES PATENT AND TRADEMARK OFFICE
CERTIFICATE OF CORRECTION

| | |
|---|---|
| PATENT NO. | : 6,664,902 B2 |
| APPLICATION NO. | : 10/003101 |
| DATED | : December 16, 2003 |
| INVENTOR(S) | : James Philip Andrew et al. |

It is certified that error appears in the above-identified patent and that said Letters Patent is hereby corrected as shown below:

COLUMN 34

Line 3, "perceptually significance there between;" should read --perceptual significance there between;--.

Signed and Sealed this

First Day of July, 2008

JON W. DUDAS
*Director of the United States Patent and Trademark Office*